US009428592B2

(12) United States Patent
Obrecht et al.

(10) Patent No.: US 9,428,592 B2
(45) Date of Patent: Aug. 30, 2016

(54) PARTIALLY HYDROGENATED NITRILE RUBBERS

(75) Inventors: Werner Obrecht, Moers (DE); Julia Maria Müller, Gilgenberg (AT); Oskar Nuyken, München (DE); Martin Schneider, Köln (DE)

(73) Assignee: LANXESS Deutschland GmbH, Cologne (DE)

( * ) Notice: Subject to any disclaimer, the term of this patent is extended or adjusted under 35 U.S.C. 154(b) by 539 days.

(21) Appl. No.: 13/814,074

(22) PCT Filed: Aug. 5, 2011

(86) PCT No.: PCT/EP2011/063570
§ 371 (c)(1),
(2), (4) Date: Sep. 12, 2013

(87) PCT Pub. No.: WO2012/019978
PCT Pub. Date: Feb. 16, 2012

(65) Prior Publication Data
US 2013/0345366 A1 Dec. 26, 2013

(30) Foreign Application Priority Data

Aug. 9, 2010 (EP) .................................... 10172314

(51) Int. Cl.
| | | |
|---|---|---|
| C08C 19/02 | (2006.01) | |
| C08C 19/08 | (2006.01) | |
| C08J 3/24 | (2006.01) | |
| C08L 9/02 | (2006.01) | |
| C08K 3/00 | (2006.01) | |
| C08K 5/14 | (2006.01) | |
| C08L 15/00 | (2006.01) | |

(52) U.S. Cl.
CPC .............. *C08C 19/02* (2013.01); *C08C 19/08* (2013.01); *C08K 3/0033* (2013.01); *C08K 5/14* (2013.01); *C08L 15/005* (2013.01); *C08J 3/24* (2013.01); *C08J 2309/02* (2013.01)

(58) Field of Classification Search
CPC ... C08C 19/02; C08C 19/08; C08C 2019/09; C08L 15/005; C08K 3/0033; C08K 5/14; C08J 3/24; C08J 2309/02; C08J 2333/20
See application file for complete search history.

(56) References Cited

U.S. PATENT DOCUMENTS

| | | | |
|---|---|---|---|
| 3,700,637 A | 10/1972 | Finch, Jr | |
| 4,631,315 A | 12/1986 | Buding et al. | |
| 4,746,707 A | 5/1988 | Fiedler et al. | |
| 4,795,788 A | 1/1989 | Himmler et al. | |
| 4,816,525 A | 3/1989 | Rempel et al. | |
| 4,857,571 A | 8/1989 | Reiter et al. | |
| 5,208,294 A * | 5/1993 | Brown .................. | C08L 15/005 525/263 |
| 5,696,190 A | 12/1997 | Brooks et al. | |
| 5,969,170 A | 10/1999 | Grubbs et al. | |
| 6,683,136 B2* | 1/2004 | Guo ........................ | C08C 19/02 524/464 |
| 7,951,875 B2 | 5/2011 | Guerin et al. | |
| 8,058,351 B2 | 11/2011 | Pawlow et al. | |
| 2002/0107138 A1 | 8/2002 | Hoveyda et al. | |
| 2002/0132892 A1 | 9/2002 | Fuchs | |
| 2002/0177710 A1 | 11/2002 | Grubbs et al. | |
| 2003/0236427 A1 | 12/2003 | Grubbs et al. | |
| 2004/0110888 A1 | 6/2004 | Guerin et al. | |
| 2004/0127350 A1 | 7/2004 | Grela | |
| 2004/0132891 A1 | 7/2004 | Ong et al. | |
| 2005/0026774 A1 | 2/2005 | Nolan | |
| 2007/0049700 A1 | 3/2007 | Obrecht et al. | |
| 2008/0293869 A1 | 11/2008 | Obrecht | |
| 2009/0069516 A1 | 3/2009 | Obrecht et al. | |
| 2009/0076226 A1 | 3/2009 | Meca et al. | |
| 2009/0076227 A1 | 3/2009 | Obrecht et al. | |
| 2010/0240848 A1 | 9/2010 | Guerin et al. | |
| 2011/0077360 A1 | 3/2011 | Obrecht et al. | |
| 2012/0116026 A1 | 5/2012 | Obrecht et al. | |
| 2013/0165661 A1 | 6/2013 | Grubbs et al. | |
| 2013/0261269 A1 | 10/2013 | Mueller et al. | |
| 2014/0051817 A1 | 2/2014 | Grubbs et al. | |

FOREIGN PATENT DOCUMENTS

| | | | |
|---|---|---|---|
| CA | 2413607 A1 | 12/2002 | |
| DE | 2539132 A1 | 3/1977 | |
| EP | 0471250 A1 | 2/1992 | |
| EP | 1304023 A1 | 4/2003 | |
| EP | 2028194 A1 | 8/2007 | |
| EP | 2147721 A1 | 1/2010 | |
| WO | WO 2011/023674 A1 * | 3/2011 | |

OTHER PUBLICATIONS

Klingender, R., Handbook of Specialty Elastomers, 2008, pp. 100-101.*
Sanford, M.S., "A versatile Precursor for the Synthesis of New Ruthenium Olefin Metathesis Catalysts", Organometallics 2001, 20, pp. 5314-5318.
Krause, J.O., "Synthesis and Reactivity of Homogeneous and Heterogeneous Ruthenium-Based Metathesis Catalysts Containing Electron-Withdrawing Ligands", Chem. Eur. J. 2004, 10, pp. 777-784.
Bujok, R., "Ortho-and Para-Substituted Hoveyda-Grubbs Carbenes. An Improved Synthesis of Highly Efficient Metathesis Initiators", J. Org. Chem. 2004, 69, pp. 6894-6896.

(Continued)

*Primary Examiner* — Roberto Rabago

(57) ABSTRACT

Provided are new partially hydrogenated nitrile rubbers which are distinguished by a specific ratio of viscosity to molecular weight, and also vulcanizable mixtures and vulcanizates based on said rubbers, and also the associated preparation processes. The partially hydrogenated nitrile rubbers lead to compounded formulations having advantageous processing properties in conjunction with excellent vulcanizate properties.

18 Claims, No Drawings

(56) References Cited

OTHER PUBLICATIONS

Grela, K., "A Good Bargain: An Inexpensive, Air-Stable Ruthenium Metathesis Catalyst Derived from a-Asarone", Eur. J. Org. Chem. 2003, pp. 963-96.
Romero, P.E., "Rapidly Initiating Ruthenium Olefin-Metathesis Catalysts", Angew. Chem. Int. Ed., 2004, 43, pp. 6161-6165.
Grela, K., "A Highly Efficient Ruthenium Catalyst for Metathesis Reactions", Angew. Chem. Int. Ed., 2002, 41, No. 21, pp. 4038-4040.
Schrock, R.R., "Molybdenum and Tungsten Imido Alkylidene Complexes as Efficient Olefin-Metathesis Catalysts", Angew. Chem. Int. Ed., 2003, 42, pp. 4592-4633.
Kautschuk & Gummi, "IR-Spectrometric Determination of the Proportions of Acrylonitrile, Butadiene and Hydrogenated Butadiene in Hydrogenated Acrylonitrile-Butadiene Rubbers", Kunststoffe, vol. 42, (1989), No. 2, pp. 107-110, & vol. 42, No. 3, pp. 194-197.
European Search Report from co-pending Application EP10172314 dated Nov. 30, 2010, 2 pages.

* cited by examiner

PARTIALLY HYDROGENATED NITRILE RUBBERS

The present invention relates to new partially hydrogenated nitrile rubbers which are notable for a specific ratio of viscosity to molecular weight, and to vulcanizable mixtures and vulcanizates based thereon, and also to the associated preparation processes.

Metathesis reactions are used extensively as part of a wide variety of chemical reactions, for example in ring-closing metatheses (RCM), cross-metatheses (CM), ring-opening metatheses (ROM), ring-opening metathesis polymerizations (ROMP), acyclic diene metathesis polymerizations (ADMET), self-metathesis, reaction of alkenes with alkynes (enyne reactions), polymerization of alkynes, and olefinization of carbonyls (WO-A-97/06185 and Platinum Metals Rev., 2005, 49(3), 123-137). Metathesis reactions are employed, for example, for olefin synthesis, for the ring-opening polymerization of norbornene derivatives, for the depolymerization of unsaturated polymers and for the synthesis of telechelics.

The metathetical degradation of polybutadiene is carried out in accordance with WO 2006/127483 for the preparation of functionalized polybutadiene with molar masses from 7500 to 100 000 g/mol in the presence of a functionalized acyclic diene. For this purpose, polybutadiene is partially hydrogenated prior to the metathetical degradation, to leave less than 0.5 mol %, preferably less than 0.25 mol %, of vinylic double bonds in the polymer. The acyclic diene used for the metathetical degradation has one or two functional groups, more particularly alkoxysilane groups, and is used in amounts of 0.0001 to 1 mol % per mole of double bonds.

In order to obtain nitrile rubbers ("NBR") having good processing properties, it has been found appropriate to subject the nitrile rubbers to a metathetical degradation to achieve a reduction in the molecular weight. This metathetical degradation is known from, for example, WO-A-02/100905, WO-A-02/100941 and WO-A-03/002613. Here, frequently, low molecular mass 1-olefins are added. The metathesis reaction is carried out usefully in the same solvent as the hydrogenation reaction, so that after the end of the metathesis the degraded nitrile rubber does not have to be isolated from the solvent before being subjected to the subsequent hydrogenation. For the catalysis of the metathesis degradation reaction, metathesis catalysts are used that are tolerant towards polar groups, more particularly towards nitrile groups.

WO-A-02/100905 and WO-A-02/100941 describe a process which embraces the degradation of nitrile rubber starting polymers by metathesis and a subsequent hydrogenation to give hydrogenated nitrile rubbers ("HNBR") having a lower Mooney viscosity. In this case, a nitrile rubber is first reacted in the presence of a low molecular mass olefin, frequently referred to in the literature as "co-olefin", and in the presence of specific complex catalysts based on osmium, ruthenium, molybdenum or tungsten, and in a $2^{nd}$ step the product is hydrogenated. Obtainable by this pathway are HNBRs having a weight average of the molecular weight ($M_w$) in the range of 30 000-250 000, a Mooney viscosity (ML 1+4 at 100° C.) in the range of 3-50 Mooney units and a polydispersity index PDI of less than 2.5.

In recent years, a variety of catalyst structures and catalyst classes theoretically suitable for metathesis have been described, but are not automatically also suitable for the metathesis of nitrile rubber.

Publications disclosing metathesis catalysts include WO-A-96/04289 and WO-A-97/06185. These catalysts possess the following fundamental structure:

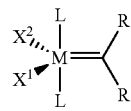

in which M is osmium or ruthenium, R stands for identical or different organic radicals, with a wide range of structural variation, $X^1$ and $X^2$ are anionic ligands, and L represents neutral electron donors. The term "anionic ligands" is always used in the literature for such metathesis catalysts to refer to those ligands which, when considered as removed from the metal centre, are negatively charged with a closed electron shell.

Particularly noteworthy is the bis(tricyclohexylphosphine)benzylideneruthenium dichloride catalyst shown below (known as the "Grubbs (I)" catalyst).

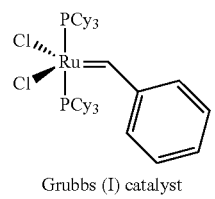

Grubbs (I) catalyst

Ruthenium-based and osmium-based catalysts suitable for the metathetic degradation of NBR are described in EP-A-1 760 093, EP-A-1 826 220, EP 2 028 194 and EP-A-2 027 920.

A very wide variety of different additions are known in the art for enhancing the activity of the catalysts used in the metathetic degradation of nitrile rubber: EP-A-1 825 913 describes an activity boost through addition of various salts, EP-A-1 894 946 through addition of phosphanes, EP-A-2 027 919 through addition of alkaline earth metal halides, EP-A-2 030 988 through addition of transition metal alkoxides, EP-A-2 145 681 through addition of $BF_3$ adducts, and EP-A-2 145 680 through addition of boric esters.

Common to all of the above-stated processes for the metathetic degradation of nitrile rubber is that unhydrogenated nitrile rubber is treated preferably using 1-olefins as so-called co-olefins with metathesis catalysts, the molecular weight of the nitrile rubber being reduced and the width of the molar mass distribution becoming narrower (evident from lower values for the polydispersity index PDI=Mw/Mn, where Mw is the weight average of the molecular weight and Mn is the number average of the molecular weight). In rubber mixtures, the hydrogenated nitrile rubbers obtained by hydrogenation of these metathetically degraded nitrile rubbers exhibit improved processing properties, an example being an improved mould filling in injection moulding. Following peroxidic crosslinking of such rubber mixtures, however, in comparison to hydrogenated nitrile rubbers prepared without metathetic degradation, the vulcanizates obtained have a lower Shore A hardness, a lower level of modulus under different strains, and lower tensile strengths (R. Parg, C. Wrana, D. Achten, paper given to the Autumn Rubber Conference at Hanover, November 2004 "Therban® Advanced Technology—The new low molecular weight HNBR"; J. Ismeier, paper given to the DKG [German Rubber Association] Southern and South-Western Germany Regional Group Conference on 02.06.2005 "Therban® AT—A new polymer for engine compartment seals"). To date there is no known process which allows the production of hydrogenated nitrile rubber having improved processing behaviour without impaired mechanical properties at the same time.

Known from WO-A-00/71554 is a group of catalysts referred to in the art as "Grubbs (II) catalysts". EP-A-1 426 383 discloses the use of a Grubbs (II) catalyst of this kind, such as, for example, the (1,3-bis(2,4,6-trimethylphenyl) 2-imidazolidinyl idene)(tricyclohexylphosphine)-ruthenium (phenylmethylene)dichloride catalyst below, for the metathesis of nitrile rubber without addition of a co-olefin.

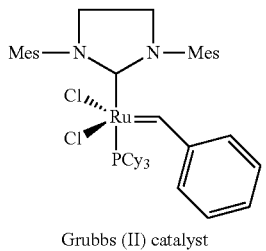

Grubbs (II) catalyst

Following subsequent hydrogenation, which is carried out preferably in the same solvent as the metathesis, the hydrogenated nitrile rubber has lower molecular weights and a narrower molecular weight distribution (PDI) than when using catalysts of the Grubbs (I) type, and also has reduced mixture viscosities, and therefore improved processing qualities. Nevertheless, the vulcanizates prepared by peroxidic crosslinking on the basis of these hydrogenated nitrile rubbers also exhibit a reduced level of modulus and lower tensile strengths as compared with vulcanizates based on hydrogenated nitrile rubbers of higher molecular mass.

No measures have been disclosed to date to allow the processing properties of hydrogenated nitrile rubber to be improved, in the form of a reduced Mooney viscosity of the hydrogenated nitrile rubber as such or of the rubber mixtures comprising it, without accompanying detriment to the vulcanizate properties (Shore A hardness, stress values at different strains, breaking strength, elongation at break, abrasion and heat build-up under dynamic stress).

The object of the present invention was to provide hydrogenated nitrile rubbers which can be mixed and processed readily and easily with other constituents and nevertheless, following peroxidic vulcanization, lead to vulcanizates which exhibit a high level of mechanical and dynamic properties, particularly with regard to the Shore A hardness, the stress values at different strains, the breaking strength, elongation at break, DIN abrasion and heat build-up.

This object has been achieved by first-time provision of partially hydrogenated nitrile rubbers which are distinguished by a specific ratio of solution viscosity to weight average of the molecular weight.

The invention provides partially hydrogenated nitrile rubbers having degrees of hydrogenation in the range from 50% to 97%, which have a ratio of solution viscosity (SV) divided by the weight average of the molecular weight (Mw) in the range from $4*10^{-3}$ to $50*10^{-3}$ Pa*s*mol/kg.

The partially hydrogenated nitrile rubbers of the invention preferably possess a degree of hydrogenation in the range from 52.5% to 96.5%, more preferably 55% to 96%, very preferably 57.7% to 95.5% and more particularly 60% to 95%, and have a ratio of solution viscosity (SV) divided by the weight average of the molecular weight (Mw) in the range from $5*10^{-3}$ to $45*10^{-3}$ Pa*s*mol/kg, more preferably $5*10^{-3}$ to $40*10^{-3}$ Pa*s*mol/kg, very preferably from $6*10^{-3}$ to $35*10^{-3}$ Pa*s*mol/kg and more particularly $6.5*10^{-3}$ to $30*10^{-3}$ Pa*s*mol/kg.

Provided are partially hydrogenated nitrile rubbers having degrees of hydrogenation in the range from 50% to 97%, which have a ratio of solution viscosity (SV) divided by the weight average of the molecular weight (Mw) in the range from $4*10^{-3}$ to $30*10^{-3}$ Pa*s*mol/kg, preferably $5*10^{-3}$ to $30*10^{-3}$ Pa*s*mol/kg.

The partially hydrogenated nitrile rubbers of the invention have an advantageously low solution viscosity and in the unvulcanized state, both in the form of the crude rubbers and in the form of rubber mixtures prepared from them, exhibit a significantly improved processing behaviour without observed detriment to the mechanical and dynamic vulcanizate properties (Shore A hardness, stresses at different strains, tensile strength elongation at break, DIN abrasion and heat build-up).

The invention provides additionally, therefore, a process for preparing the partially hydrogenated nitrile rubbers of the invention, which is characterized in that partially hydrogenated nitrile rubbers having degrees of hydrogenation in the range from 50% to 97% are subjected in the presence of a complex catalyst based on a metal from transition group 6 or 8 of the periodic table that has at least one ligand attached carbenically to the metal to a metathesis reaction, the metathesis taking place substantially free from $C_2$-$C_{16}$ olefins.

One embodiment of the invention provides a process for preparing partially hydrogenated nitrile rubbers having a degree of hydrogenation in the range from 50% to 97%, which have a ratio of solution viscosity (SV) divided by the weight average of the molecular weight (Mw) in the range from $4*10^{-3}$ to $30*10^{-3}$ Pa*s*mol/kg, which is characterized in that partially hydrogenated nitrile rubbers having degrees of hydrogenation in the range from 50% to 97% are subjected in the presence of a complex catalyst based on a metal from transition group 6 or 8 of the Periodic Table which has at least one ligand attached carbenically to the metal, to a metathesis reaction, the metathesis taking place substantially free from $C_2$-$C_{16}$ olefins.

The invention provides, additionally, vulcanizable mixtures comprising the partially hydrogenated nitrile rubbers of the invention and at least one peroxidic crosslinker and also optionally at least one filler and optionally one or more further additives, and also the preparation of these vulcanizable mixtures.

The invention provides, furthermore, a process for preparing vulcanizates, by exposing the vulcanizable mixtures of the invention to an elevated temperature and crosslinking them.

Further provided by the invention are the vulcanizates obtained in such a process.

For the purposes of this specification, "substantially free from $C_2$-$C_{16}$ olefins" means that, during the metathesis reaction of the partially hydrogenated nitrile rubber, $C_2$-$C_{16}$ olefins are present in an amount totaling not more than 2 phr, i.e. 2 parts by weight per 100 parts by weight of the partially hydrogenated nitrile rubber. In the metathesis reaction, $C_2$-$C_{16}$ olefins of this kind, which encompass straight-chain and branched olefins, more particularly ethylene, propylene, isobutene, styrene, 1-hexene or 1-octene, are present preferably in an amount totaling not more than 1.5 phr, more preferably not more than 1.0 phr, very preferably not more than 0.5 phr and more particularly not more than 0.25 phr.

In the context of this specification, all definitions of radicals, parameters or elucidations that are given above and below, whether general or in ranges of preference, can be combined with one another, thus including combinations between the respective ranges and preference ranges in any desired way.

The term "substituted" used in the context of this specification in connection with the various types of metathesis catalysts or other compounds having general formulae means that a hydrogen atom on the radical or atom indicated is replaced by one of the groups specified in each case, with the proviso that the valency of the indicated atom is not exceeded and that the substitution leads to a stable compound.

In the context of this specification, a "partially hydrogenated nitrile rubber having a degree of hydrogenation of x %" means that, in this nitrile rubber, x % of the C═C double bonds originally present in the copolymerized diene monomers of the nitrile rubber are hydrogenated. This degree of hydrogenation is determined by IR spectroscopy in accordance with Kautschuke+Gummi Kunststoffe, Vol. 42 (1989) No. 2, 107-110 (Part 1) and also Kautschuke+Gummi Kunststoffe, Vol 42 (1989) No. 3, 194-197 (Part 2).

Partially Hydrogenated Nitrile Rubber Used:

The preparation process of the invention uses partially hydrogenated nitrile rubbers having degrees of hydrogenation in the range from 50% to 97%, preferably 52.5% to 96.5%, more preferably 55% to 96%, very preferably 57.7% to 95.5% and more particularly 60% to 95%.

These partially hydrogenated nitrile rubbers contain repeating units which derive from at least one conjugated diene and at least one $\alpha,\beta$-unsaturated nitrile, the C═C double bonds of the copolymerized diene repeating units being hydrogenated to an extent of at least 50% up to not more than 97%, preferably at least 52.5% up to 96.6%, more preferably at least 55% up to 96%, very preferably at least 57.5% up to 96.5% and more particularly at least 60% up to 95%.

In the process of the invention it is possible, additionally, to use partially hydrogenated nitrile rubbers which satisfy the conditions specified above and additionally contain repeating units which derive from one or more other copolymerizable termonomers.

The conjugated diene may be of any kind. It is preferred to use ($C_4$-$C_6$) conjugated dienes. Particularly preferred are 1,3-butadiene, isoprene, 2,3-dimethylbutadiene, piperylene or mixtures thereof. Especially preferred are 1,3-butadiene and isoprene or mixtures thereof. Very particularly preferred is 1,3-butadiene.

As $\alpha,\beta$-unsaturated nitrile it is possible to use any known $\alpha,\beta$-unsaturated nitrile, preference being given to ($C_3$-$C_5$) $\alpha,\beta$-unsaturated nitriles such as acrylonitrile, methacrylonitrile, ethacrylonitrile or mixtures thereof, Acrylonitrile is particularly preferred.

As further copolymerizable termonomers it is possible to use, for example, aromatic vinyl monomers, preferably styrene, $\alpha$-methylstyrene and vinylpyridine, fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline and N-phenyl-4-(4-vinylbenzyloxy)aniline, and also non-conjugated diene, such as 4-cyanocyclohexene and 4-vinylcyclohexene, or else alkynes, such as 1- or 2-butyne.

As further copolymerizable termonomers it is also possible to use one or more copolymerizable termonomers that contain carboxyl groups, examples being $\alpha,\beta$-unsaturated monocarboxylic acids, esters thereof, amides thereof, $\alpha,\beta$-unsaturated dicarboxylic acids their monoesters or diesteis or, their corresponding anhydrides or amides.

As $\alpha,\beta$-unsaturated monocarboxylic acids, it is possible with preference to use acrylic acid and methacrylic acid. Also suitable for use are esters of $\alpha,\beta$-unsaturated monocarboxylic acids, preferably their alkyl esters alkoxyalkyl or hydroxyalkyl esters.

Preferred are $C_1$-$C_{18}$ alkyl; esters of $\alpha,\beta$-unsaturated monocarboxylic acids, more preferably $C_1$-$C_{18}$ alkyl esters of acrylic or methacrylic acid, with particular preference methyl(meth)acrylate, ethyl(meth)acrylate, propyl(meth) acrylate, n-butyl(meth)acrylate, tert-butyl(meth)acrylate, hexyl(meth)acrylate, 2-ethylhexyl(meth)acrylate, octyl (meth)acrylate, n-dodecyl(meth)acrylate, 2-propylheptyl acrylate and lauryl(meth)acrylate. Use is made more particularly of n-butyl acrylate.

Also preferred are $C_2$-$C_{12}$ alkoxyalkyl esters of $\alpha,\beta$-unsaturated monocarboxylic acids, more preferably $C_2$-$C_{12}$ alkoxyalkyl esters of acrylic or methacrylic acid, more particularly methoxymethyl(meth)acrylate, methoxyethyl (meth)acrylate, ethoxyethyl(meth)acrylate and methoxyethyl(meth)acrylate. Methoxyethyl acrylate is used more particularly.

Preference is, also given to $C_1$-$C_{12}$ hydroxyalkyl esters of $\alpha,\beta$-unsaturated monocarboxylic acids, more preferably $C_1$-$C_{12}$ hydroxyalkyl esters of acrylic or methacrylic acid, more particularly 2-hydroxyethyl(meth)acrylate, 3-hydroxypropyl(meth)acrylate and hydroxybutyl(meth)acrylate.

Other esters of $\alpha,\beta$-unsaturated monocarboxylic acids to be used are furthermore, for example, polyethylene glycol (meth)acrylate, polypropylene glycol(meth)acrylate glycidyl(meth)acrylate, epoxy(meth)acrylate, N-(2-hydroxyethyl)acrylamides, N-(hydroxymethyl)acrylamides and urethane(meth)acrylate.

It is also possible to use mixtures of alkyl esters, such as, for example, those specified above, with alkoxyalkyl esters, for example, those specified above.

Also suitable for use are cyanoalkyl acrylates and cyanoalkyl methacrylates in which the number of C atoms in the cyanoalkyl group is 2-12, preferably $\alpha$-cyanoethyl acrylate, $\beta$-cyanoethyl acrylate and cyanobutyl methacrylate.

Also suitable for use are fluorine-substituted, benzyl-containing acrylates or methacrylates, preferably fluorobenzyl acrylate and fluorobenzyl methacrylate. Also suitable for use are fluoroalkyl-containing acrylates and methacrylates, preferably trifluoroethyl acrylate and tetrafluoropropyl methacrylate. Also suitable for use are amino-containing $\alpha,\beta$-unsaturated carboxylic esters such as dimethylaminomethyl acrylate and diethylaminoethyl acrylate.

As copolymerizable monomers it is possible to use $\alpha,\beta$-unsaturated dicarboxylic acids, preferably maleic acid, fumaric acid, crotonic acid, itaconic acid, citraconic acid and mesaconic acid.

It is also possible to use $\alpha,\beta$-unsaturated dicarboxylic anhydrides, preferably maleic anhydride, itaconic anhydride, citraconic anhydride and mesaconic anhydride.

It is possible, furthermore, to use monoesters or diesters of $\alpha,\beta$-unsaturated dicarboxylic acids. These $\alpha,\beta$-unsaturated dicarboxylic monoesters or diesters may be, for example, alkyl esters, preferably $C_1$-$C_{10}$ alkyl, more particularly ethyl, n-propyl-, isopropyl, n-butyl, tert-butyl, n-pentyl or n-hexyl, alkoxyalkyl esters, preferably $C_1$-$C_{12}$ alkoxyalkyl, more preferably $C_3$-$C_8$ alkoxyalkyl, hydroxyalkyl esters, preferably $C_1$-$C_{12}$ hydroxyalkyl, more preferably $C_2$-$C_8$ hydroxyalkyl, cycloalkyl esters, preferably $C_5$-$C_{12}$ cycloalkyl, more preferably $C_6$-$C_{12}$ cycloalkyl, alkylcycloalkyl esters, preferably $C_6$-$C_{12}$ alkylcycloalkyl, more preferably $C_7$-$C_{10}$ alkylcycloalkyl, or aryl esters, preferably $C_6$-$C_{14}$ aryl monoesters or diesters, where in the case of the diesters the esters in question may in each case also be identical or mixed esters.

Examples of α,β-unsaturated dicarboxylic acid monoesters encompass
- maleic acid monoalkyl esters, preferably monomethyl maleate, monoethyl maleate, monopropyl maleate and mono-n-butyl maleate;
- maleic acid monocycloalkyl esters, preferably monocyclopentyl maleate, monocyclohexyl maleate and monocycloheptyl maleate;
- maleic acid monoalkylcycloalkyl esters, preferably monomethylcyclopentyl maleate and monoethylcyclohexyl maleate;
- maleic acid monoaryl esters, preferably monophenyl maleate;
- maleic acid monobenzyl esters, preferably monobenzyl maleate;
- fumaric acid monoalkyl esters, preferably monomethyl fumarate, monoethyl fumarate, monopropyl fumarate and mono-n-butyl fumarate;
- fumaric acid monocycloalkyl esters, preferably monocyclopentyl fumarate, monocyclohexyl fumarate and monocycloheptyl fumarate;
- fumaric acid monoalkylcycloalkyl esters, preferably monomethylcyclopentyl fumarate and monoethylcyclohexyl fumarate;
- fumaric acid monoaryl esters, preferably monophenyl fumarate;
- fumaric acid monobenzyl esters, preferably monobenzyl fumarate;
- citraconic acid monoalkyl esters, preferably monoethyl citraconate, monoethyl citraconate, monopropyl citraconate and mono-n-butyl citraconate;
- citraconic acid monocycloalkyl esters, preferably monocyclopentyl citraconate, monocyclohexyl citraconate and monocycloheptyl citraconate;
- citraconic acid monoalkylcycloalkyl esters, preferably monomethylcyclopentyl citraconate and monoethylcyclohexyl citraconate;
- citraconic acid monoaryl esters, preferably monophenyl citraconate;
- citraconic acid monobenzyl esters, preferably monobenzyl citraconate;
- itaconic acid monoalkyl esters, preferably monomethyl itaconate, monoethyl itaconate, monopropyl itaconate and mono-n-butyl itaconate;
- itaconic acid monocycloalkyl esters, preferably monocyclopentyl itaconate, monocyclohexyl itaconate and monocycloheptyl itaconate;
- itaconic acid monoalkylcycloalkyl esters, preferably monomethylcyclopentyl itaconate and monoethylcyclohexyl itaconate;
- itaconic acid monoaryl esters, preferably monophenyl itaconate;
- itaconic acid monobenzyl esters, preferably monobenzyl itaconate;
- mesaconic acid monoalkyl esters, preferably monoethyl mesaconate.

As α,β-unsaturated dicarboxylic diesters it is possible to use the analogous diesters based on the aforementioned monoester groups, and the ester groups may also be chemically different groups.

The fractions of repeating units in the partially hydrogenated NBR polymers which originate from the conjugated diene and from the α,β-unsaturated nitrile may vary within wide ranges. The fraction of or sum of the conjugated dienes is typically in the range from 40% to 90% by weight, preferably in the range from 50% to 85% by weight, based on the overall polymer. The fraction or the sum of the α,β-unsaturated nitriles is typically 10% to 60% by weight, preferably 15% to 50% by weight, based on the overall polymer. The fractions of the monomers add up in each case to 100% by weight. Depending on the nature of the termonomer or termonomers, the additional termonomers may be present in amounts from 0% to 40% by weight, based on the overall polymer. In this case, corresponding fractions of the conjugated diene or dienes and/or of the α,β-unsaturated nitrile or nitriles are replaced by the fractions of the additional monomers, with the fractions of all the monomers adding up in each case to 100% by weight.

The partially hydrogenated nitrile rubbers used in accordance with the invention possess a Mooney viscosity (ML 1+4 at 100° C.) in the range from 10 to 120 Mooney units, preferably from 20 to 100 Mooney units. The Mooney viscosity is determined in accordance with ASTM standard D 1646.

It is possible, for example, to use partially hydrogenated nitrile rubbers having a Mooney viscosity (ML 1+4 at 100° C.) in the range from 30 to 70, preferably from 30 to 50, which then typically possess a weight average of the molecular weight Mw in the range from 150 000 to 500 000, preferably in the range from 180 000 to 400 000, and a polydispersity PDI=Mw/Mn, where Mw is the weight average and Mn the number average of the molecular weight, in the range from 2.0 to 6.0, preferably in the range of 2.0-4.0.

Partially hydrogenated nitrile rubbers of this kind are well known to the skilled person and either are available commercially, as for example under the brand name Therban® from Lanxess Deutschland GmbH, or else can be prepared by methods familiar to the skilled worker. The preparation of partially hydrogenated nitrile rubbers is typically accomplished by emulsion polymerization followed by a hydrogenation, and is known to the skilled person from a large number of literature references and patents.

The partial hydrogenation of corresponding nitrile rubbers can be accomplished using homogeneous or heterogeneous hydrogenation catalysts. The catalysts used are based typically on rhodium, ruthenium or titanium, although platinum, iridium, palladium, rhenium, ruthenium, osmium, cobalt or copper may also be used, either as the metal or else, preferably, in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in homogeneous phase are described below and are also known from DE-A-25 39 132 and EP-A-0 471 250.

The selective hydrogenation may be achieved, for example, in the presence of a catalyst containing rhodium or ruthenium. Use may be made, for example, of a catalyst of the general formula $$(R^1_m B)_l M X_n,$$

in which M is ruthenium or rhodium, $R^1$ is identical or different at each occurrence and represents a $C_1$-$C_8$ alkyl group, a $C_4$-$C_8$ cycloalkyl group, a $C_6$-$C_{15}$ aryl group or a $C_7$-$C_{15}$ aralkyl group, B is phosphorus, arsenic, sulphur or a sulphoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethylsulphoxide)rhodium(III) chloride and also tetrakis(triphenylphosphine)rhodium hyride of the formula $((C_6H_5)_3P)_4RhH$ and the corresponding compounds in which some or all of the triphenylphosphine has been replaced by tricyclohexylphosphine. The catalyst can be utilized in small quantities. A quantity in the range of 0.01-1% by weight, preferably in the range of 0.03-0.5% by weight and more preferably in the range of 0.1-0.3% by weight, based on the weight of the polymer, is suitable.

Typically it is useful to use the catalyst together with a co-catalyst which is a ligand of the formula $R^1{}_mB$, where $R^1$, m and B possess the definitions given above for the catalyst. Preferably, m is 3, B is phosphorus, and the radicals $R^1$ may be identical or different. The co-catalysts in question are preferably those with trialkyl, tricycloalkyl, triaryl, triaralkyl, diaryl-monoalkyl, diaryl-monocycloalkyl, dialkyl-monoaryl, dialkyl-monocycloalkyl, dicycloalkyl-monoaryl or dicycloalkyl-monoaryl radicals.

Examples of co-catalysts are found in U.S. Pat. No. 4,631,315, for example. A preferred co-catalyst is triphenylphosphine. The co-catalyst is used preferably in amounts in a range of 0.3-5% by weight, preferably in the range of 0.5-4% by weight, based on the weight of the nitrile rubber to be hydrogenated. Preferably, moreover, the weight ratio of the rhodium-containing catalyst to the co-catalyst is in the range from 1:3 to 1:55, more preferably in the range from 1:5 to 1:45. Based on 100 parts by weight of the nitrile rubber to be hydrogenated, suitably 0.1 to 33 parts by weight of the co-catalyst, preferably 0.5 to 20 and very preferably 1 to 5 parts by weight, more particularly more than 2 but less than 5 parts by weight, of co-catalyst are used, based on 100 parts by weight of the nitrile rubber to be hydrogenated.

The practical implementation of this hydrogenation is known to the skilled worker from U.S. Pat. No. 6,683,136. It is typically accomplished by causing hydrogen to act on the nitrile rubber to be hydrogenated, in a solvent such as toluene or monochlorobenzene, at a temperature in the range from 100 to 150° C. under a pressure in the range from 50 to 150 bar for 2 to 10 hours.

When heterogeneous catalysts are employed, those in question are typically supported catalysts based on palladium, which are supported, for example, on carbon, silica, calcium carbonate or barium sulphate.

Metathesis Catalysts:

The metathesis catalysts to be used in accordance with the invention are, on a proven basis, complex catalysts based on molybdenum, osmium or ruthenium. These complex catalysts possess the common structural feature that they have at least one ligand bonded carbenically to the metal. In one preferred embodiment, the complex catalyst has two carbene ligands, i.e. two ligands bonded carbenically to the central metal of the complex.

Use may be made, for example, of a catalyst of the general formula (A),

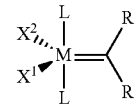

(A)

in which

M is osmium or ruthenium, $X^1$ and $X^2$ are identical or different and are to ligands, preferably anionic ligands, the symbols L represent identical or different ligands, preferably uncharged electron donors, the radicals R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_2$ carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where these radicals may all in each case optionally be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, is optionally substituted and may contain one or more heteroatoms.

In one embodiment of the catalysts of the general formula (A) for inventive use, one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphinyl, where these radicals may all in each case be substituted by one or more alkyl, halogen, alkoxy, aryl or heteroaryl radicals.

In the catalysts of the general formula (A), $X^1$ and $X^2$ are identical or different and are two ligands, preferably anionic ligands. $X^1$ and $X^2$ can be, for example, hydrogen, halogen, pseudohalogen, straight-chain or branched $C_1$-$C_{30}$-alkyl, $C_1$-$C_{20}$-alkoxy, $C_6$-$C_{24}$-aryloxy, $C_3$-$C_{20}$-alkyldiketonate $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals, too, may once again be substituted by one or more substituents selected from the group consisting of halogen, preferably fluorine, $C_1$-$C_5$-alkyl, $C_1$-$C_5$-alkoxy and phenyl. In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate. In a particularly preferred embodiment, $X^1$ and $X^2$ are identical and are each halogen, in particular chlorine, $CF_3COO$, $CH_3COO$, $CFH_2COO$, $(CH_3)_3CO_3$ $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (A), the symbols L represent identical or different ligands and are preferably uncharged electron donors. The two ligands L can, for example, be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_{10}$-alkylphosphine or $C_3$-$C_{20}$-cycloalkylphosphine ligand, a sulphonated $C_6$-$C_{24}$-arylphosphine or sulphonated $C_1$-$C_{10}$-alkylphosphine ligand, a $C_6$-$C_{24}$-arylphosphinite or $C_1$-$C_{10}$-alkylphosphinite ligand, a $C_6$-$C_{24}$-arylphosphonite or $C_1$-$C_{10}$-alkylphosphonite ligand, a $C_6$-$C_{24}$-aryl phosphite or $C_1$-$C_{10}$-alkyl phosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_5$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which is in turn optionally substituted by a halogen-, $C_1$-$C_5$-alkyl or $C_1$-$C_5$-alkoxy radical.

The term "phosphine" includes, for example, $PPh_3$, P(p-Tol)$_3$, P(o-Tol)$_3$, $PPh(CH_3)_2$, $P(CF_3)_3$, P(p-$FC_6H_4$)$_3$, P(p-$CF_3C_6H_4$)$_3$, P($C_6H_4$—$SO_3Na$)$_3$, P($CH_2C_6H_4$—$SO_3Na$)$_3$, P(isopropyl)$_3$, P($CHCH_3(CH_2CH_3)$)$_3$, P(cyclopentyl)$_3$, P(cyclohexyl)$_3$, P(neopentyl)$_3$ and P(neophenyl)$_3$. The term "phosphinite" includes, for example, triphenylphosphinite, tricyclohexylphosphinite, triisopropylphosphinite and methyldiphenylphosphinite. The term "phosphite" includes, for example, triphenyl phosphite, tricyclohexyl phosphite, tri-tert-butyl phosphite, triisopropyl phosphite and methyl diphenyl phosphite. The term "stibine" includes, for example, triphenylstibine, tricyclohexylstibine and trimethylstibine. The term "sulphonate" includes, for example, trifluoromethanesulphonate, tosylate and mesylate. The term "sulphoxide" includes, for example, $(CH_3)_2S(=O)$ and $(C_6H_5)_2S=O$. The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands as are mentioned, for example, by Grubbs in WO-A-03/011455. Examples are: pyridine, picolines (α-, β- and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

If one or both of the ligands L is an imidazolidine radical (Im), this radical usually has a structure corresponding to the general formulae (IIa) or (IIb),

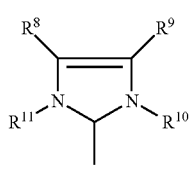
(IIa)

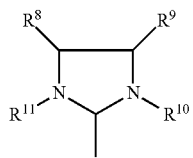
(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl.

For clarification it should be noted that the designation of the "imidazolidine radical (Im)" selected above and also used below encompasses not only imidazolidine ligands of the general formula (IIa) but also imidazolidine ligands of the general formula (IIb). Likewise embraced by this designation of the "imidazolidine radical (Im)" are imidazolidine ligands of the general formulae (IIIb), (IIId) and (IIIf) and imidazolidine ligands of the general formulae (IIIa), (IIIc) and (IIIe).

Optionally, one or more of the radicals $R^8$, $R^9$, $R^{10}$, $R^{11}$ can independently of one another be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazolidine radical depicted in the general formulae (IIa) and (IIb) in the present specification are equivalent to the structures (IIa') and (IIb') which are frequently also found in the literature for this imidazolidine radical (Im) and emphasize the carbene character of the imidazolidine radical. This applies analogously to the associated preferred structures (IIIa)-(IIIf) depicted below.

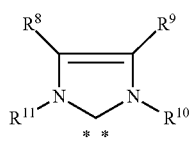
(IIa')

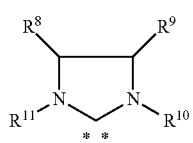
(IIb')

In a preferred embodiment of the catalysts of the formula (A), $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the radicals $R^{10}$ and $R^{11}$ are also identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals as meanings of $R^{10}$ and $R^{11}$ are optionally substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl, mesityl or 2,6-diisopropylphenyl.

Particularly preferred imidazolidine radicals (Im) have the following structures (IIIa) to (IIIf), where Ph is in each case a phenyl radical, Bu is a butyl radical and Mes is in each case a 2,4,6-trimethylphenyl radical or Mes is alternatively in all cases 2,6-diisopropylphenyl.

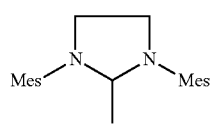

(IIIa)

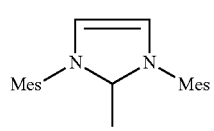

(IIIb)

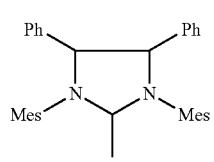

(IIIc)

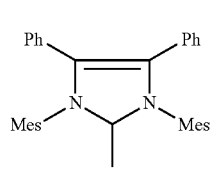

(IIId)

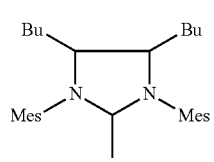

(IIIe)

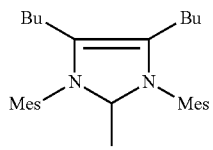

(IIIf)

A wide variety of representatives of the catalysts of the formula (A) are known in principle, e.g. from WO-A-96/04289 and WO-A-97/06185.

As an alternative to the preferred Im radicals, one or both ligands L in the general formula (A) are also preferably identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one or both ligands L in the general formula (A) being a trialkylphosphine ligand in which at least one of the alkyl groups is a secondary, alkyl group or a cycloalkyl group, preferably isopropyl, isobutyl, sec-butyl, neopentyl, cyclopentyl or cyclohexyl.

Particular preference is given to catalysts which come under the general formula (A) and have the structures (IV) (Grubbs (I) catalyst) and (V) (Grubbs (II) catalyst), where Cy is cyclohexyl.

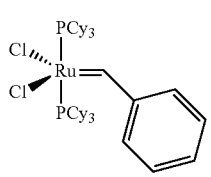

(IV)

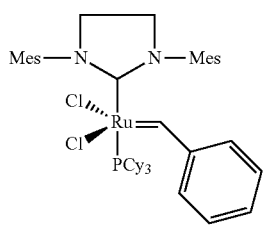

(V)

In a further embodiment, use is made of a catalyst of the general formula (A1)

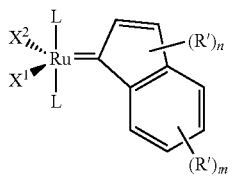

(A1)

where
$X^1$, $X^2$ and L can have the same general, preferred and particularly preferred meanings as in the general formula (A),
n is 0, 1 or 2,
m is 0, 1, 2, 3 or 4 and
the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radicals which may all in each case be substituted by one or more alkyl, halogen, alkoxy, aryl or heteroaryl radicals.

As preferred catalyst coming under the general formula (A1), it is possible to use the catalyst of the formula (VI) below, where Mes is 2,4,6-trimethylphenyl and Ph is phenyl.

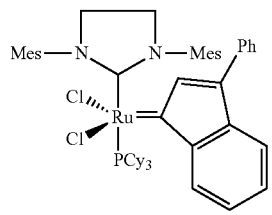

(VI)

This catalyst, which is also referred to in the literature as "Nolan catalyst", is known, for example, from WO-A-2004/112951.

Also established is the use of a catalyst of the general formula (B),

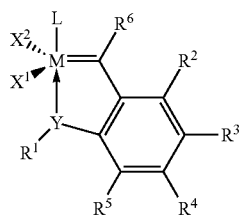

(B)

where
M is ruthenium or osmium,
$X^1$ and $X^2$ are identical or different ligands, preferably anionic ligands,
Y is oxygen (O), sulphur (S), an N—$R^1$ radical or a P—$R^1$ radical, where $R^1$ is as defined below,
$R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals,
$R^2$, $R^3$, $R^4$ and $R^5$ are identical or different and are each hydrogen or an organic or inorganic radical,
$R^6$ is hydrogen or an alkyl, alkenyl, alkynyl or aryl radical and
L is a ligand which has the same meanings as for formula (A).

The catalysts of the general formula (B) are known in principle. Representatives of this class of compounds are the catalysts described by Hoveyda et al. in US 2002/0107138 A1 and Angew. Chem. Int. Ed. 2003, 42, 4592, and the catalysts described by Grela in WO-A-2004/035596, Eur. J. Org. Chem 2003, 963-966 and Angew. Chem. Int. Ed. 2002, 41, 4038 and also in J. Org. Chem. 2004, 69, 6894-96 and Chem. Eur. J 2004, 10, 777-784. The catalysts are commercially available or can be prepared as described in the literature references cited.

In the catalysts of the general formula (B), L is a ligand which usually possesses an electron donor function and can have the same general, preferred and particularly preferred meanings as L in the general formula (A).

Furthermore, L in the general formula (B) is preferably a $P(R^7)_3$ radical, where the radicals $R^7$ are each, independently of one another, $C_1$-$C_6$-alkyl, $C_3$-$C_8$-cycloalkyl or aryl, or else is a substituted or unsubstituted imidazolidine radical ("Im").

$C_1$-$C_6$-alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-cycloalkyl encompasses cyclopropyl, cyclobutyl, cyclopentyl, cyclohexyl, cycloheptyl and cyclooctyl.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The imidazolidine radical (Im) has a structure of the aforementioned general formulae (IIa) or (IIb),

(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{29}$-aryloxy, $C_2$-$C_{20}$-alkoxycarbonyl, thio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$alkylsulphinyl.

If appropriate, one or more of the radicals $R^8$-$R^{11}$ may, independently of one another, be substituted by one or more substituents, preferably straight-chain or branched $C_1$-$C_{10}$-alkyl, $C_3$-$C_8$-cycloalkyl, alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

It is established in particular to use catalysts of the general formula (B) in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radical, where all the abovementioned radicals may optionally in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a further preferred embodiment, use is made of a catalyst of the formula (B) in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, or $C_6$-$C_{10}$-arylsulphonate, particularly preferably p-toluenesulphonate.

The abovementioned radicals as meanings of $R^{10}$ and $R^{11}$ are optionally substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl or mesityl.

Particularly preferred imidazolidine radicals (Im) have the structures (IIIa-IIIf) mentioned above, where Mes is in each case 2,4,6-trimethylphenyl.

In the catalysts of the general formula (B), $X^1$ and $X^2$ are identical or different and can each be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_1$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphinyl.

The abovementioned radicals $X^1$ and $X^2$ can also be substituted by one or more further radicals, for example by halogen preferably fluorine, $C_1$-$C_{10}$-alkyl, $C_1$-$C_{10}$-alkoxy or $C_6$-$C_{24}$-aryl radicals, where the latter radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3CO$, $CH_3COO$, $CFH_2COO$, $(CH_3)_3CO_3(CF_3)_2(CH_3)CO$, $(CF_3)(CH_3)_2CO_3PhO$ (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may in each case optionally be substituted by one or more alkyl, halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$alkoxy, $C_2$-$C_{20}$-alkenyloxy, $C_2$-$C_{20}$-alkynyloxy, $C_6$-$C_{24}$-aryloxy, $C_2$-$C_{20}$alkoxycarbonyl, alkylamino, $C_1$-$C_{20}$-alkylthio, $C_6$-$C_{24}$-arylthio, $C_1$-$C_{20}$-alkylsulphonyl or $C_1$-$C_{20}$-alkylsulphinyl radical which may all in each case optionally be substituted by one or more alkyl, halogen, alkoxy, aryl or heteroaryl radicals.

$R^1$ is preferably a $C_3$-$C_{20}$-cycloalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

The $C_3$-$C_{20}$-Cycloalkyl radical encompasses, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl which may all be in each case optionally substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_6$-$C_{24}$-arylthio, $C_1$-$C_{20}$-alkylsulphonyl or $C_1$-$C_{20}$-alkylsulphinyl which may in each case optionally be substituted by one or more $C_1$-$C_{20}$-alkyl, $C_1$-$C_{20}$-alkoxy, halogen, $C_6$-$C_{24}$-aryl or heteroaryl radicals.

In a particularly established embodiment, $R^2$, $R^3$, $R^4$, $R^5$ are identical or different and are each nitro, straight-chain or branched $C_1$-$C_{20}$-alkyl, $C_5$-$C_{20}$-cylcoalkyl, straight-chain or branched $C_1$-$C_{20}$-alkoxy or $C_6$-$C_{24}$-aryl radicals, preferably phenyl or naphthyl. The $C_1$-$C_{20}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (B), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Further suitable are catalysts of the general formula (B1),

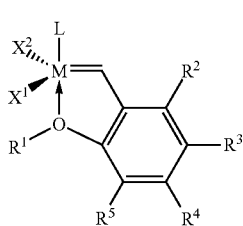

(B1)

where
M, L, $X^1$, $X^2$, $R^1$, $R^2$, $R^3$, $R^4$ and $R^5$ can have the general, preferred and particularly preferred meanings mentioned for the general formula (B).

The catalysts of the general formula (B1) are known in principle from, for example, US 2002/0107138 A1 and can be obtained by preparative methods indicated there.

Particular preference is given to catalysts of the general formula (B1) in which
M is ruthenium,
$X^1$ and $X^2$ are both halogen, in particular both chlorine,
$R^1$ is a straight-chain or branched $C_1$-$C_{12}$-alkyl radical,
$R^2$, $R^3$, $R^4$, $R^5$ have the general and preferred meanings mentioned for the general formula (B) and
L has the general and preferred meanings mentioned for the general formula (B).

Especial preference is given to catalysts of the general formula (B1) in which
M is ruthenium,
$X^1$ and $X^2$ are both chlorine,
$R^1$ is an isopropyl radical,
$R^2$, $R^3$, $R^4$, $R^5$ are all hydrogen and
L is a substituted or unsubstituted imidazolidine radical of the formulae (IIa) or (IIb),

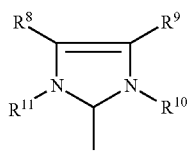

(IIa)

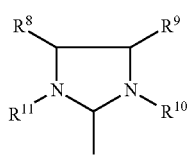

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphinyl, where the abovementioned radicals may in each case be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, and these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

Very particular preference is given to a catalyst which comes under the general structural formula (B1) and has the formula (VII), where Mes is in each case 2,4,6-trimethylphenyl.

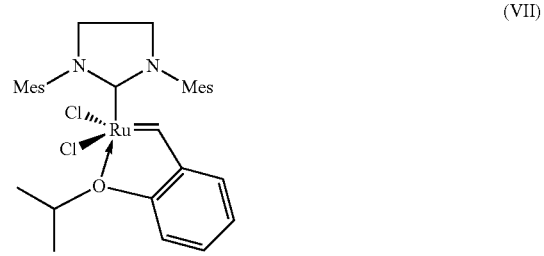

(VII)

This catalyst (VII) is also referred to as "Hoveyda catalyst" in the literature.

Further suitable catalysts are those which come under the general structural formula (B1) and have one of the formulae (VIII), (IX), (X), (XI), (XII), (XIII), (XIV) and (XV) below, where Mes is in each case 2,4,6-trimethylphenyl.

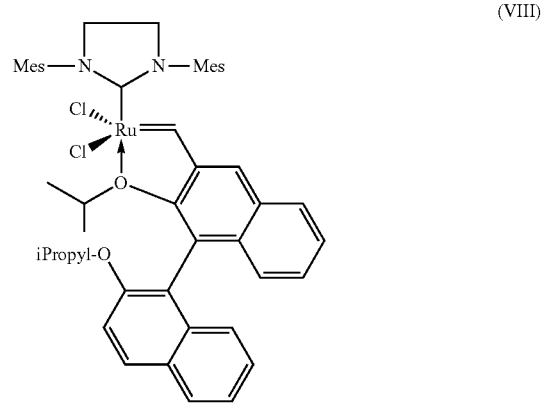

(VIII)

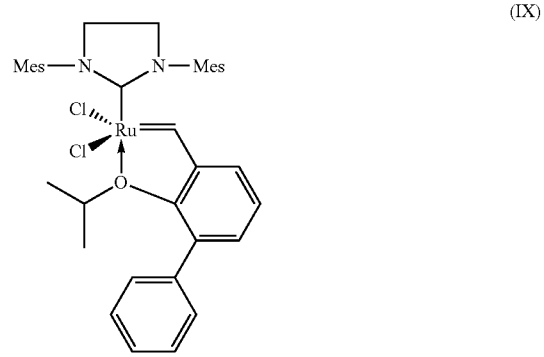

(IX)

-continued (X)
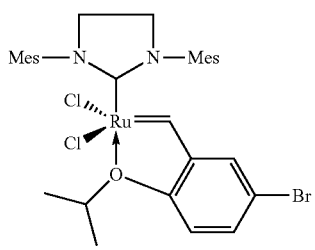

(XI)
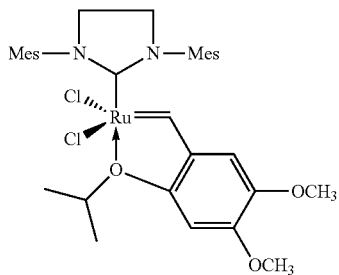

(XII)
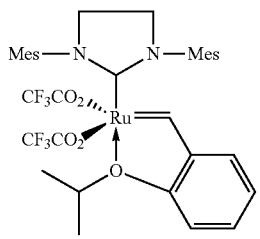

(XIII)
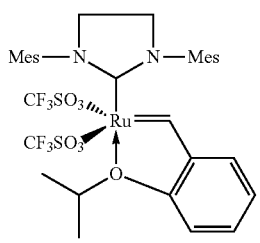

(XIV)
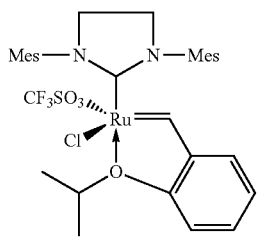

(XV)
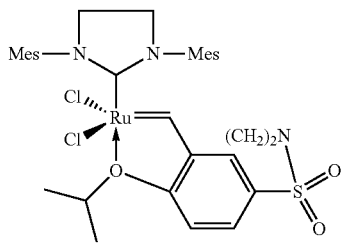

A further suitable catalyst has the general formula (B2),

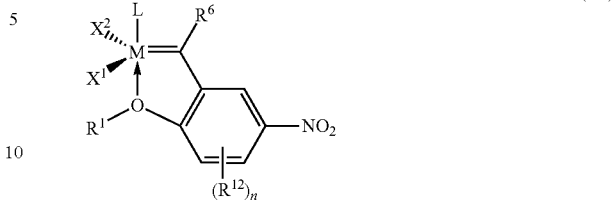

(B2)

where
M, L, $X^1$, $X^2$, $R^1$ and $R^6$ have the general and preferred meanings mentioned for the formula (B),
the radicals $R^{12}$ are identical or different and have the general and preferred meanings, with the exception of hydrogen, mentioned for the radicals $R^2$, $R^3$, $R^4$ and $R^5$ in the formula (B) and
n is 0, 1, 2 or 3.

The catalysts of the general formula (B2) are known in principle from, for example, WO-A-2004/035596 (Grela) and can be obtained by preparative methods indicated there.

Particular preference is given to catalysts of the general formula (B2) in which
M is ruthenium,
$X^1$ and $X^2$ are both halogen, in particular both chlorine,
$R^1$ is a straight-chain or branched $C_1$-$C_{12}$-alkyl radical,
$R^{12}$ has the meanings mentioned for the general formula (B2),
n is 0, 1, 2 or 3,
$R^6$ is hydrogen and
L has the meanings mentioned for the general formula (B).

Very particular preference is given to catalysts of the general formula (B2) in which
M is ruthenium,
$X^1$ and $X^2$ are both chlorine,
$R^1$ is an isopropyl radical,
n is 0 and
L is a substituted or unsubstituted imidazolidine radical of the formulae (IIa) or (IIb), where $R^8$, $R^9$, $R^{10}$, $R^{11}$ are identical or different and have the meanings mentioned for the very particularly preferred catalysts of the general formula (B1).

Particularly suitable is a catalyst of the structure (XVI) below

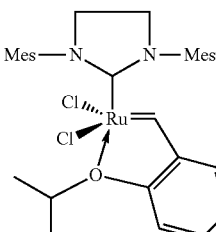(XVI)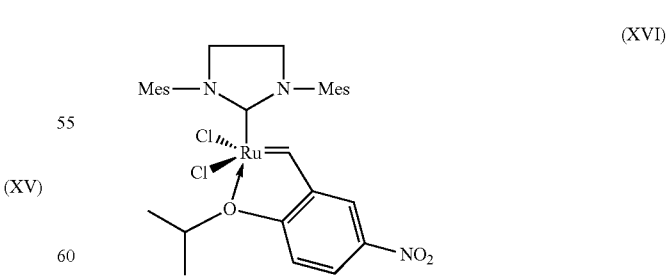

The catalyst (XVI) is also referred to as "Grela catalyst" in the literature.

A further suitable catalyst which comes under the general formula (B2) has the structure (XVII), where Mes is in each case 2,4,6-trimethylphenyl.

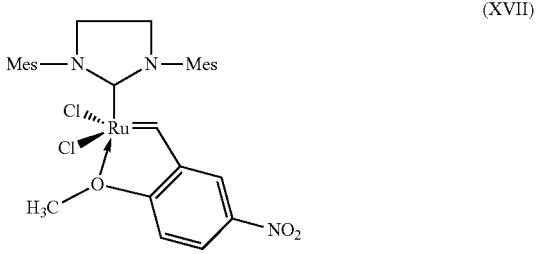

(XVII)

An alternative option also is to use a catalyst of the general formula (B3) having a dendritic structure,

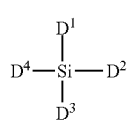

(B3)

where $D^1$, $D^2$, $D^3$ and $D^4$ each have a structure of the general formula (XVIII) shown below which is bound via the methylene group shown at right to the silicon of the formula (B3),

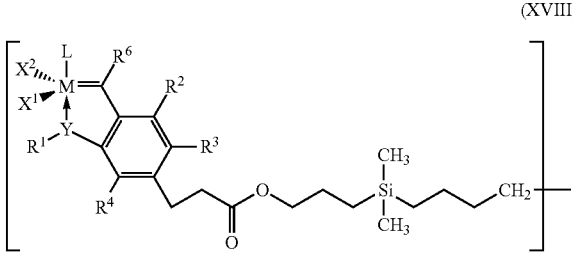

(XVIII)

where

L, $X^1$, $X^2$, $R^1$, $R^2$, $R^3$, $R^5$ and $R^6$ can have the general and preferred meanings mentioned for the general formula (B).

The catalysts of the general formula (B3) are known from US 2002/0107138 A1 and can be prepared as described there.

A further alternative embodiment provides a catalyst of the formula (B4),

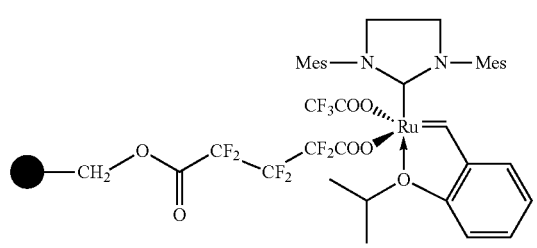

(B4)

where the symbol ● represents a support.

The support is preferably a poly(styrene-divinylbenzene) copolymer (PS-DVB).

The catalysts of the formula (B4) are known in principle from Chem. Eur. J. 2004 10, 777-784 and can be obtained by the preparative methods described there.

All the abovementioned catalysts of type (B) can either be added as such to the mixture of the partially hydrogenated nitrile rubber and of the vinyl-containing silicone rubber or else can be applied to and immobilized on a solid support. Suitable solid phases or supports are materials which firstly are inert towards the reaction mixture of the metathesis and secondly do not adversely affect the activity of the catalyst. To immobilize the catalyst, it is possible to use for example, metals, glass, polymers, ceramic, organic polymer beads or inorganic sol-gels carbon black, silica, silicates, calcium carbonate and barium sulphate.

A further embodiment provides a catalyst of the general formula (C),

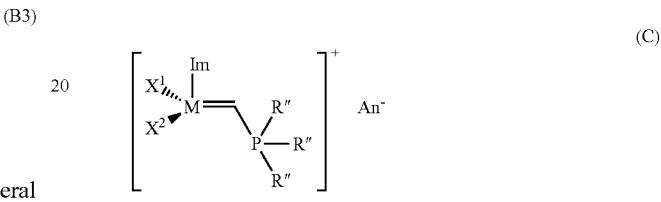

(C)

where

M is ruthenium or osmium, $X^1$ and $X^2$ are identical or different and are anionic ligands, R" are identical or different and are organic radicals, Im is a substituted or unsubstituted imidazolidine radical and An is an anion.

The catalysts of the general formula (C) are known in principle (see, for example, Angew. Chem., Int. Ed. 2004, 43, 6161-6165).

$X^1$ and $X^2$ in the general formula (C) can have the same general, preferred and particularly preferred meanings as in the formulae (A) and (B).

The imidazolidine radical (Im) usually has a structure of the general formula (IIa) or (IIb) which have been mentioned above for the catalyst type of the formulae (A) and (B) and can have all the structures mentioned there as preferred, in particular those of the formulae (IIIa)-(IIIf).

The radicals R" in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

Preference is given to the radicals R" in the general formula (C) being identical and each being phenyl, cyclohexyl, cyclopentyl, isopropyl, o-tolyl, o-xylyl or mesityl.

A further alternative option is to use a catalyst of the general formula (D)

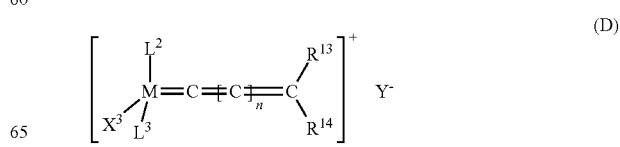

(D)

where
M is ruthenium or osmium,
$R^{13}$ and $R^{14}$ are each, independently of one another, hydrogen, $C_1$-$C_{20}$-alkyl, $C_2$-$C_{20}$-alkenyl, $C_2$-$C_{20}$ alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_5$-$C_{24}$-aryloxy, $C_2$-$C_{20}$-alkoxycarbonyl, $C_1$-$C_{20}$-alkylthio, $C_1$-$C_{20}$alkylsulphonyl or $C_1$-$C_{20}$ alkylsulphinyl,
$X^3$ is an anionic ligand,
$L^2$ is an uncharged π-bonded ligand which may either be monocyclic or polycyclic,
$L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines, stibines, ethers, amines, amides, imines, sulphoxides, thioethers and pyridines,
$Y^-$ is a noncoordinating anion and
n is 0, 1, 2, 3, 4 or 5.

A further embodiment entails using a catalyst of the general formula (E),

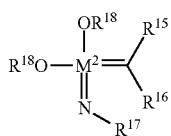
(E)

where
$M^2$ is molybdenum,
$R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphinyl,
$R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

A further alternative option is to use a catalyst of the general formula (F),

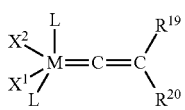
(F)

where
M is ruthenium or osmium,
$X^1$ and $X^2$ are identical or different and are anionic ligands which can have all meanings of $X^1$ and $X^2$ mentioned in the general formulae (A) and (B),
the symbols L represent identical or different ligands which can have all meanings of L mentioned in the general formulae (A) and (B),
$R^{19}$ and $R^{20}$ are identical or different and are each hydrogen or substituted or unsubstituted alkyl.

A further alternative option is to use a catalyst of the general formulae (G), (H) or (K),

(G)

(H)

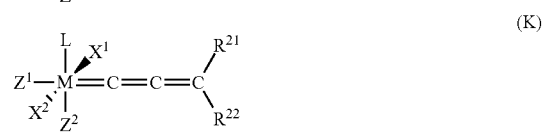
(K)

where
M is osmium or ruthenium,
$X^1$ and $X^2$ are identical or different and are two ligands, preferably anionic ligands,
L is a ligand, preferably an uncharged electron donor,
$Z^1$ and $Z^2$ are identical or different and are uncharged electron donors,
$R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphinyl which are in each case substituted by one or more radicals selected from among alkyl, halogen, alkoxy, aryl or heteroaryl.

The catalysts of the general formulae (G), (H) and (K) are known in principle, e.g. from WO 2003/011455 A1, WO 2003/087167 A2, Organometallics 2001, 20, 5314 and Angew. Chem. Int. Ed. 2002, 41, 4038. The catalysts are commercially available or can be synthesized by the preparative methods indicated in the abovementioned literature references.

In the catalysts which can be used according to the invention, of the general formulae (G), (H) and (K), $Z^1$ and $Z^2$ are identical or different and are neutral electron donors. These ligands are usually weakly coordinating. The ligands are typically optionally substituted heterocyclic groups. These can be five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case optionally be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more groups, preferably groups selected from the group consisting of halogen, in particular chlorine or bromine, $C_1$-$C_5$-alkyl, $C_1$-$C_5$-alkoxy and phenyl.

Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolidines and pyrroles.

$Z^1$ and $Z^2$ can also be bridged to one another to form a cyclic structure. In this case, $Z^1$ and $Z^2$ form a single bidentate ligand.

In the catalysts of the general formulae (G), (H) and (K), L can have the same general, preferred and particularly preferred meanings as L in the general formulae (A) and (B).

In the catalysts of the general formulae (G), (H) and (K), $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_2$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_1$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphinyl, preferably $C_1$-$C_{20}$-alkylsulphinyl, where the abovementioned substituents may be substituted by one or more alkyl, halogen, alkoxy, aryl or heteroaryl radicals.

In the catalysts of the general formulae (G), (H) and (K), $X^1$ and $X^2$ are identical or different and can have the same general, preferred and particularly preferred meanings as indicated above for $X^1$ and $X^2$ in the general formula (A).

Preference is given to using catalysts of the general formulae (G), (H) and (K) in which M is ruthenium, $X^1$ and $X^2$ are both halogen, in particular chlorine, $R^1$ and $R^2$ are identical or different and are five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals, $R^{21}$ and $R^{22}$ are identical or different and are each $C_1$-$C_{30}$-alkyl, $C_3$-$C_{20}$-cycloalkyl, $C_2$-$C_{20}$-alkynyl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{21}$-aryloxy, $C_2$-$C_{20}$-alkoxycarbonyl, $C_1$-$C_{30}$-alkylamino, $C_1$-$C_{30}$-alkylthio, $C_6$-$C_{14}$-arylthio, $C_1$-$C_{10}$-alkylsulphonyl, $C_1$-$C_{20}$-alkylsulphinyl, and L has a structure of the above-described general formula (IIa) or (IIb), in particular one of the formulae (IIIa) to (IIIf).

A particularly preferred catalyst which comes under the general formula (G) has the structure (XIX),

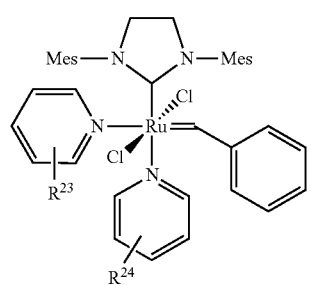

(XIX)

where $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned radicals $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may in turn each be substituted by one or more halogen, preferably fluorine, chlorine or bromine, $C_1$-$C_5$-alkyl, $C_1$-$C_5$-alkoxy or phenyl radicals.

Particularly preferred embodiments of the catalyst of the formula (XIX) have the structure (XIX a) or (XIX b), where $R^{23}$ and $R^{24}$ have the same meanings as indicated in the formula (XIX).

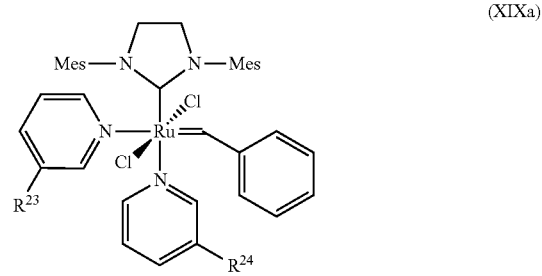

(XIXa)

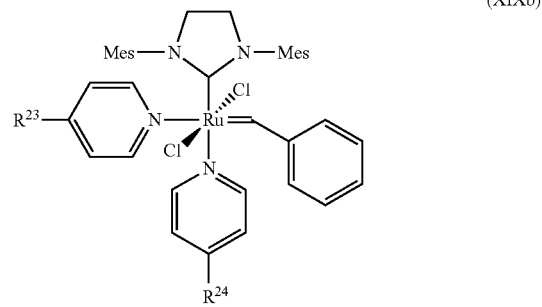

(XIXb)

Further suitable catalysts which come under the general formulae (G), (H) and (K) have the following structural formulae (XX)-(XXXI), where Mes is in each case 2,4,6-trimethylphenyl. Compound (XX) is also referred to in the literature as the Grubbs III catalyst.

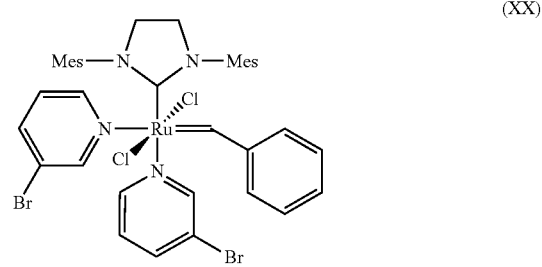

(XX)

(XXI)
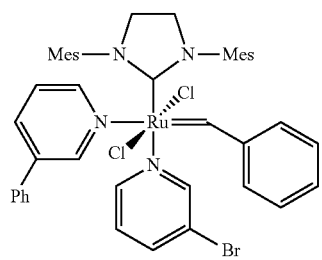
(XXII)
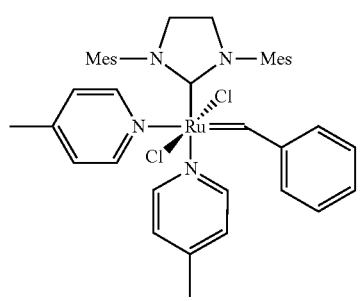
(XXIII)
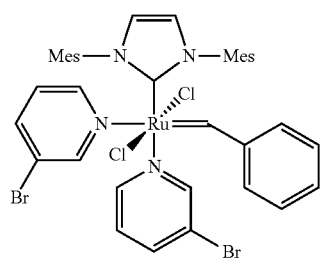
(XXIV)
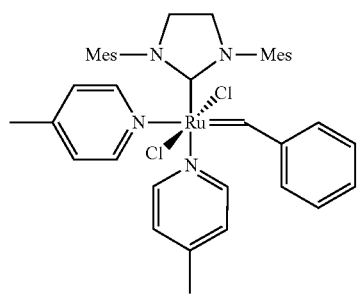
(XXV)
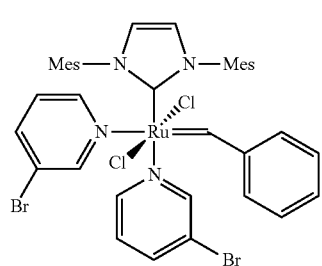
(XXVI)
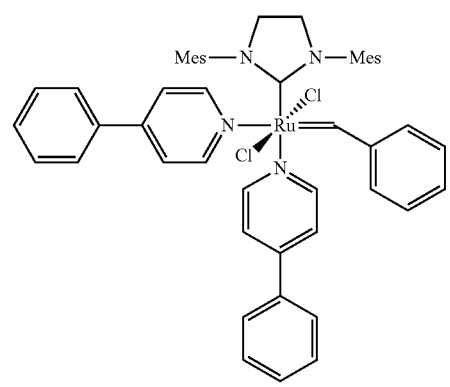
(XXVII)
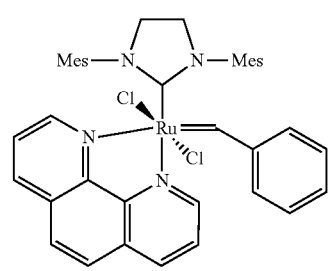
(XXVIII)
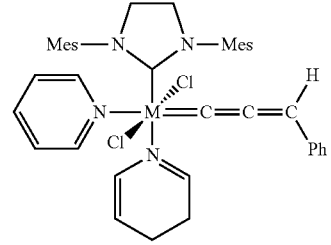
(XXIX)
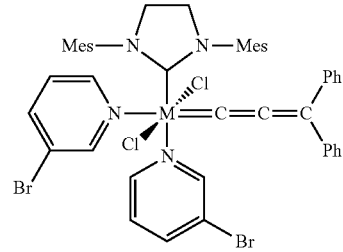
(XXX)
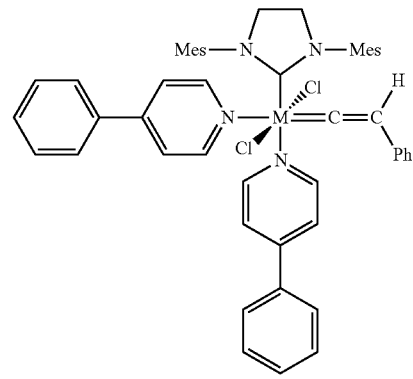

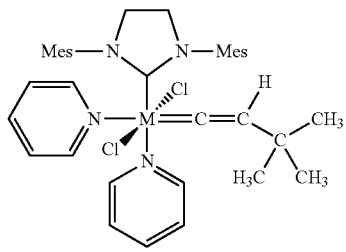

(XXXI)

A further alternative is to use a catalyst (N) which has the general structural element (N1), where the carbon atom denoted by "*" is bound via one or more double bonds to the catalyst framework,

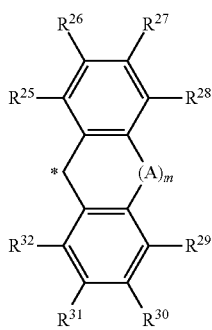

(N1)

and where
R$^{25}$-R$^{32}$ are identical or different and are each hydrogen, halogen, hydroxyl, aldehyde, keto thio CF$_3$, nitro, nitroso, cyano, thiocyano, isocyanato, carbodiimide, carbamate, thiocarbamate, dithiocarbamate, amino, amido, imino, silyl, sulphonate (—SO$_3^-$), —OSO$_3^-$, —PO$_3^-$ or OPO$_3^-$ or alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, alkylsulphinyl, dialkylammo, alkylsilyl or alkoxysilyl, radicals can each optionally be substituted by one or more alkyl, halogen, alkoxy, aryl or heteroaryl radicals, or, as an alternative, two directly adjacent radicals from the group consisting of R$^{25}$-R$^{32}$ together with the ring carbons to which they are bound form a cyclic group, preferably an aromatic system, by bridging or as an alternative, R$^8$ is optionally bridged to another ligand of the ruthenium- or osmium-carbene complex catalyst,
m is 0 or 1 and
A is oxygen, sulphur, C(R$^{33}$R$^{34}$), N—R$^{35}$, —C(R$^{36}$)—, —C(R$^{36}$)═C(R$^{37}$)—, —C(R$^{36}$)(R$^{38}$)—C(R$^{37}$)(R$^{39}$)—, where R$^{33}$-R$^{39}$ are identical or different and can each have the same meanings as the radicals R$^{25}$-R$^{32}$.

The catalysts of the invention have the structural element of the general formula (N1) where the carbon atom denoted by "*" is bound via one or more double bonds to the catalyst framework. If the carbon atom denoted by "*" is bound via two or more double bonds to the catalyst framework, these double bonds can be cumulated or conjugated.

Such catalysts (N) have been described in EP-A-2 027 920, which is hereby incorporated by reference for the definition of the catalysts (N) and their preparation, insofar as this is permitted by the relevant jurisdictions.

The catalysts (N) having a structural element of the general formula (N1) include, for example, catalysts of the general formulae (N2a) and (N2b) below,

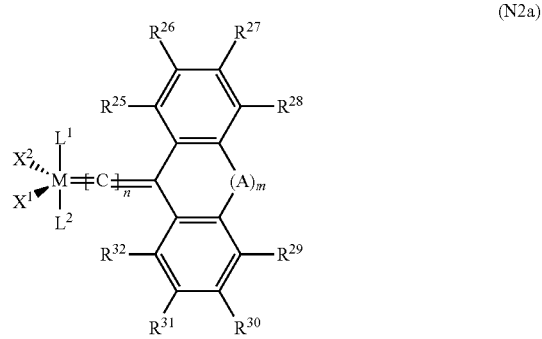

(N2a)

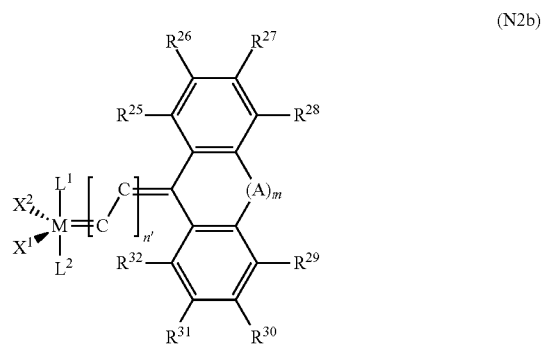

(N2b)

where
M is ruthenium or osmium,
X$^1$ and X$^2$ are identical or different and are two ligands, preferably anionic ligands,
L$^1$ and L$^2$ are identical or different ligands, preferably uncharged electron donors, where L$^2$ can alternatively also be bridged to the radical R$^8$,
n is 0, 1, 2 or 3, preferably 0, 1 or 2,
n' is 1 or 2, preferably 1, and
R$^{25}$-R$^{32}$, m and A have the same meanings as in the general formula (N1).

In the catalysts of the general formula (N2a), the structural element of the general formula (N1) is bound via a double bond (n=0) or via 2, 3 or 4 cumulated double bonds (in the case of n=1, 2 or 3) to the central metal of the complex catalyst. In the catalysts according to the invention of the general formula (N2b), the structural element of the general formula (N1) is bound via conjugated double bonds to the metal of the complex catalyst. In both cases, the carbon atom denoted by "*" has a double bond in the direction of the central metal of the complex catalyst.

The catalysts of the general formulae (N2a) and (N2b) thus encompass catalysts in which the general structural elements (N3)-(N9)

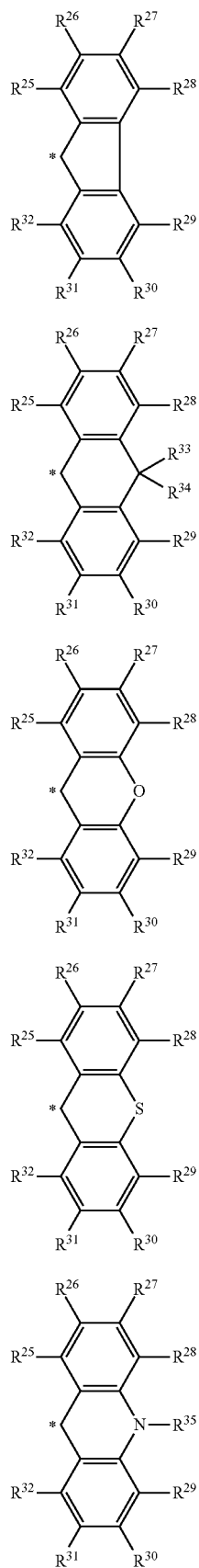

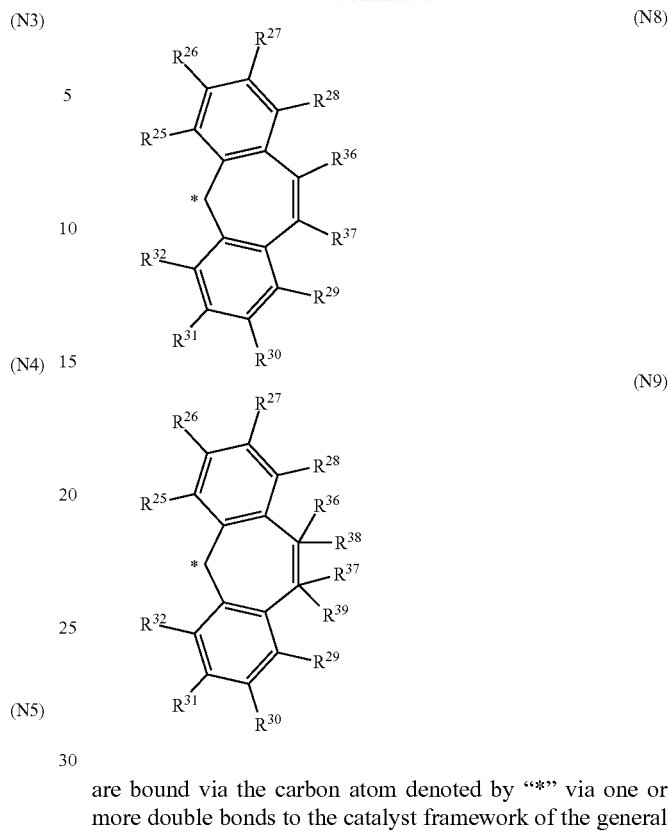

are bound via the carbon atom denoted by "*" via one or more double bonds to the catalyst framework of the general formula (N10a) or (N10b)

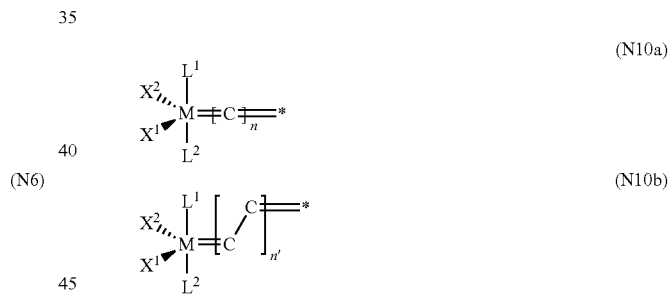

where $X^1$ and $X^2$, $L^1$ and $L^2$, n, n' and $R^{25}$-$R^{39}$ have the meanings given for the general formulae (N2a) and (N2b).

The ruthenium- or osmium-carbene catalysts of the invention typically have five-fold coordination.

In the structural element of the general formula (N1), $R^{15}$-$R^{32}$ are identical or different and are each hydrogen, halogen, hydroxyl, aldehyde, keto, thiol, $CF_3$, nitro, nitroso, cyano, thiocyano, isocyanato, carbodiimide, carbamate, thiocarbamate, dithiocarbamate, amino, amido, imino, silyl, sulphonate ($-SO_3^-$), $-OSO_3^-$, $-PO_3^-$ or $OPO_3^-$ or alkyl, preferably $C_1$-$C_{20}$-alkyl, in particular $C_1$-$C_6$-alkyl, cycloalkyl preferably $C_3$-$C_{20}$-cycloalkyl, in particular $C_3$-$C_8$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, in particular phenyl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$- alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, alkylsulphinyl, preferably $C_1$-$C_{20}$-alkylsulphinyl, dialkylamino, preferably di($C_1$-$C_{20}$-alkyl)amino, alkylsilyl, preferably $C_1$-$C_{20}$-alkylsilyl, or alkoxysilyl, preferably $C_1$-$C_{20}$-alkoxysilyl, where these radicals can each be optionally substituted by one or more alkyl, halogen, alkoxy, aryl or heteroaryl radicals, or, as an alternative, in each case two directly adjacent radicals from the group consisting of $R^{25}$-$R^{32}$ together with the ring carbons to which they are bound may also form a cyclic group, preferably an aromatic system, by bridging or, as an alternative, $R^8$ is optionally bridged to another ligand of the ruthenium- or osmium-carbene complex catalyst, m is 0 or 1 and A is oxygen, sulphur, $C(R^{33})(R^{34})$, N—$R^{35}$, —$C(R^{36})$=C$(R^{37})$— or —$C(R^{36})(R^{38})$—$C(R^{37})(R^{39})$—, where $R^{33}$-$R^{39}$ are identical or different and can each have the same preferred meanings as the radicals $R^1$-$R^8$.

$C_1$-$C_6$-Alkyl in the structural element of the general formula (N1) is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl or n-hexyl.

$C_3$-$C_8$-Cycloalkyl in the structural element of the general formula (N1) is, for example, cyclopropyl, cyclobutyl, cylopentyl, cyclohexyl, cycloheptyl or cyclooctyl.

$C_6$-$C_{24}$-Aryl in the structural element of the general formula (N1) comprises an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The radicals $X^1$ and $X^2$ in the structural element of the general formula (N1) have the same general, preferred and particularly preferred meanings indicated for catalysts of the general formula A.

In the general formulae (N2a) and (N2b) and analogously in the general formulae (N10a) and (N10b), the radicals $L^1$ and $L^2$ are identical or different ligands, preferably neutral electron donors, and can have the same general, preferred and particularly preferred meanings indicated for catalysts of the general formula A.

Preference is given to catalysts of the general formulae (N2a) or (N2b) having a general structural unit (N1) in which M is ruthenium, $X^1$ and $X^2$ are both halogen, n is 0, 1 or 2 in the general formula (N2a) or n' is 1 in the general formula (N2b)

$L^1$ and $L^2$ are identical or different and have the general or preferred meanings indicated for the general formulae (N2a) and (N2b), $R^{25}$-$R^{32}$ are identical or different and have the general or preferred meanings indicated for the general formulae (N2a) and (N2b), m is either 0 or 1, and, when m=1, A is oxygen, sulphur, $C(C_1$-$C_{10}$-alkyl$)_2$, —$C(C_1$-$C_{10}$-alkyl), —$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

Very particular preference is given to catalysts of the formulae (N2a) or (N2b) having a general structural unit (N1) in which M is ruthenium, $X^1$ and $X^2$ are both chlorine, n is 0, 1 or 2 in the general formula (2a) or n' is 1 in the general formula (N2b)

$L^1$ is an imidazolidine radical of one of the formulae (IIIa) to (IIIf), $L^2$ is a sulphonated phosphine, phosphate, phosphinite, phosphonite, arsine, stibine, ether, amine, amide, sulphoxide, carboxyl, nitrosyl, pyridine radical, an imidazolidine radical of one of the formulae (XIIa) to (XIIf) or a phosphine ligand, in particular $PPh_3$, $P(p\text{-}Tol)_3$, $P(o\text{-}Tol)_3$, $PPh(CH_3)_2$, $P(CF_3)_3$, $P(p\text{-}FC_6H_4)_3$, $P(p\text{-}CF_3C_6H_4)_3$, $P(C_6H_4\text{—}SO_3Na)_3$, $P(CH_2C_6H_4\text{—}SO_3Na)_3$, $P(isopropyl)_3$, $P(CHCH_3(CH_2CH_3))_3$, $P(cyclopentyl)_3$, $P(cyclohexyl)_3$, $P(neopentyl)_3$ and $P(neophenyl)_3$, $R^{25}$-$R^{32}$ have the general or preferred meanings indicated for the general formulae (N2a) and (N2b), m is either 0 or 1 and, when m=1,

A is oxygen, sulphur, $C(C_1$-$C_{10}$-alkyl$)_2$, —$C(C_1$-$C_{10}$alkyl$)_2$, —$C(C_1$-$C_{10}$-alkyl$)_2$-, —$C(C_1$-$C_{10}$-alkyl)=$C(C_1$-$C_{10}$-alkyl)- or —$N(C_1$-$C_{10}$-alkyl).

When the radical $R^{25}$ is bridged to another ligand of the catalyst of the formula N, this results, for example for the catalysts of the general formulae (N2a) and (N2b), in the following structures of the general formulae (N13a) and (N13b)

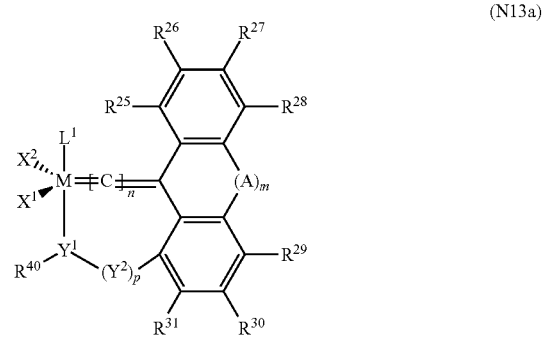

(N13a)

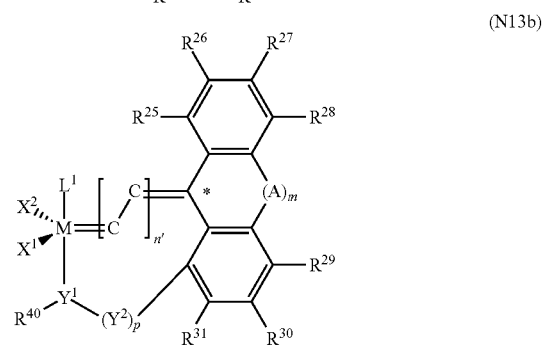

(N13b)

where $Y^1$ is oxygen, sulphur, an N—$R^{41}$ radical or a P—$R^{41}$ radical, where $R^{41}$ has the meanings indicated below, $R^{40}$ and $R^{41}$ are identical or different and are each an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical which may each be optionally substituted by one or more alkyl, halogen, alkoxy, aryl or heteroaryl radicals, p is 0 or 1 and $Y^2$ when p=1 is —$(CH_2)_r$— where r=1, 2 or 3, —C(=O)—$CH_2$—, —C(=O)—, —N=CH—, —N(H)—C(=O)— or, as an alternative, the entire structural unit "—Y$^1$(R$^{40}$)—(Y$^2$)$_p$—" is (—N(R$^{40}$)=CH—CH$_2$—), (—N(R$^{40}$, R$^{41}$)=CH—CH$_2$—), and
where M, X$^1$, X$^2$, L$^1$, R$^{25}$-R$^{32}$, A, m and n have the same meanings as in the general formulae (IIa) and (IIb).
As examples of catalysts of the formula (N), mention may be made of the following structures:
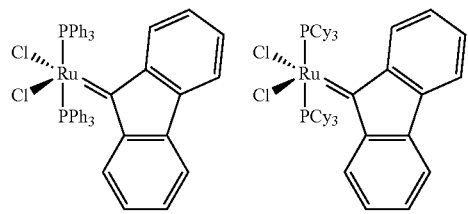
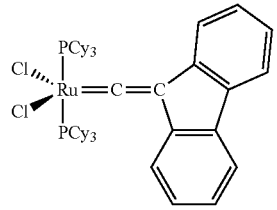
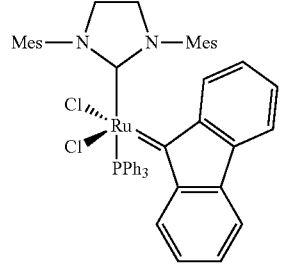
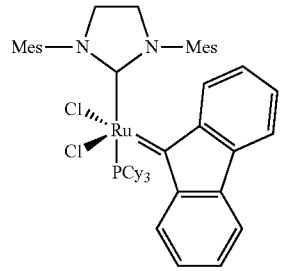
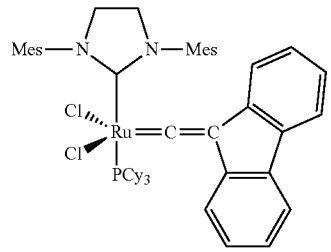
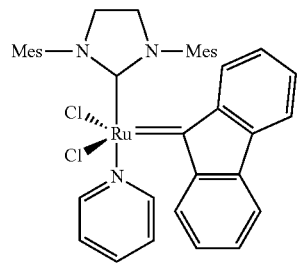
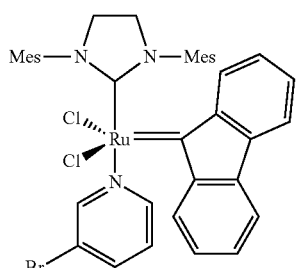
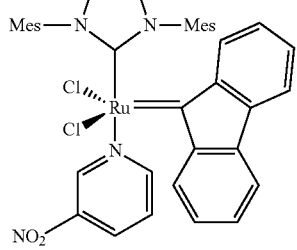
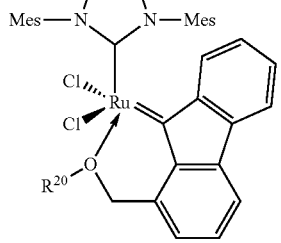
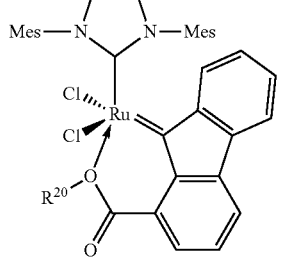
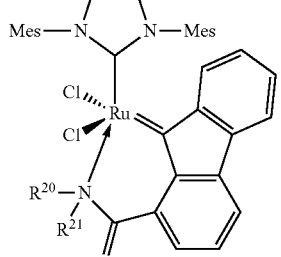
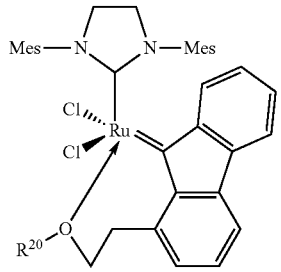

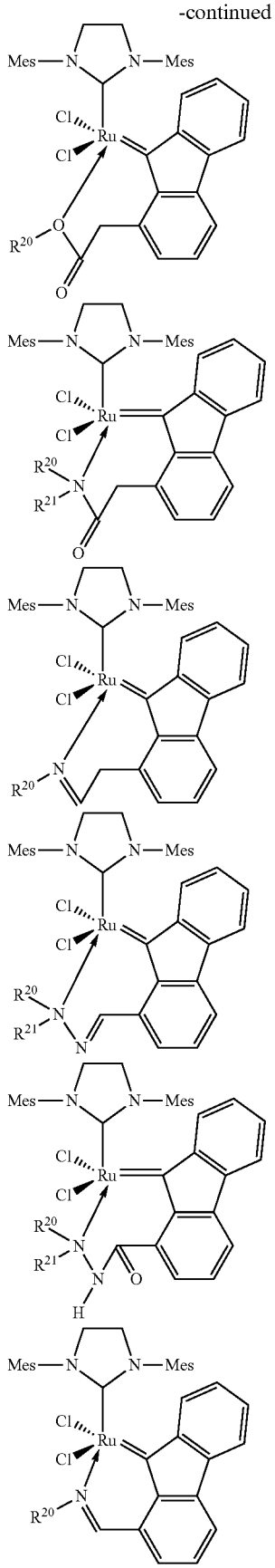

In order to boost the activity of the aforesaid catalysts which can be used for the metathetic degradation of the partially hydrogenated nitrile rubber, it is possible to add various salts as per EP-A-1 825 913, phosphanes in line with EP-A-1 894 946, alkaline earth metal halides in line with EP-A-2 027 919, transition metal alkoxides as per EP-A-2030988, $BF_3$ adducts according to EP-A-2 145 681, and boric esters as per EP-A-2 145 680. Combinations of these additions are possible as well.

Procedure for the Metathesis Reaction:

In the process of the invention, the amount of the catalyst used for the metathesis is dependent on the nature and the catalytic activity of the specific catalyst. The amount of catalyst used, based on the partially hydrogenated nitrile rubber used, is 5 to 1000 ppm of noble metal, preferably from 10-500 ppm, more particularly from 25-250 ppm.

The metathesis reaction is typically conducted in a suitable solvent which does not deactivate the catalyst used and also does not adversely affect the reaction in any other way. Preferred solvents include, but are not limited to, dichloromethane, benzene, toluene, methyl ethyl ketone, acetone, tetrahydrofuran, tetrahydropyran, dioxane and cyclohexane. The particularly preferred solvent is chlorobenzene.

The concentration of the partially hydrogenated nitrile rubber used in the reaction mixture of the metathesis is not critical, although it must of course be ensured that the reaction is not adversely affected by an excessively high viscosity of the reaction mixture and by the mixing problems which this entails. The concentration of the partially hydrogenated nitrile rubber in the reaction mixture is preferably in the range from 1% to 20% by weight, more preferably in the range from 5% to 15% by weight, based on the overall reaction mixture.

The metathetic degradation is conducted typically at a temperature in the range from 20° C. to 150° C., preferably in the range from 25 to 100° C., more particularly in the range from 30 to 90° C.

With particular preference the metathesis is conducted at a temperature in the range from 25 to 90° C., more particularly at a temperature in the range from 25 to 80° C.

The reaction time is dependent on a series of factors, examples being the type of partially hydrogenated nitrile rubber, the nature of the catalyst, the catalyst concentration used, and the reaction temperature. The reaction is typically at an end within a few hours, preferably up to three hours under standard conditions. The progress of the metathesis can be monitored by standard analysis, for example by GPC or determination of the viscosity.

Determination of $M_w$ and $M_n$ of the Nitrile Rubbers by GPC:

The weight average Mw and number average Mn of the molecular weight are determined by means of gel permeation chromatography (GPC). For the GPC analysis, small samples of the solutions of the partially hydrogenated nitrile rubber are taken from the reaction mixture, and are arrested by addition of a suitable amount of ethyl vinyl ether, and diluted with N,N'-dimethylacetamide (for example, by addition of 3 ml of N,N'-dimethylacetamide (from Acros Organics; admixed with 5 g/L LiBr) to 0.2 ml of the arrested nitrile rubber solution. Before the GPC analysis is carried out, these solutions are each filtered, with a 0.2 μm Teflon syringe filter (Chromafil PTFE 0.2 μm; from Macherey-Nagel) having been found appropriate. After that, GPC analysis is carried out using an instrument from Waters, fitted with a Waters 717 autosampler, a PSS Gram 10 μm 8×50 mm preliminary column, a PSS Gram-30 10 μm 8×300 mm column and two PSS Gram-1000 10 μm 8×300 mm columns from Polymer Standards Service, a Waters 410 RI detector and Cirrus Software Multi Version 3.0. The columns are calibrated with linear polymethyl methacrylate with molar masses of 600 to $1.64 \cdot 10^6$ g/mol from Polymer Standards Service. The measurements were carried out with a flow rate of 1.0 mL/min at 80° C. using N,N'-dimethylacetamide (with 5 g/L LiBr) as eluent.

Determination of the Solution Viscosity ("SV")

The solution viscosity is determined on a cone/plate rheometer (Brookfield RVDV-III UCP) from Brookfield (Larch). At the desired points in time of the reaction, a suitable amount of reaction solution is taken from the system and the solution viscosity is determined immediately thereafter. It has been found appropriate to take an amount of 2 ml in each case. Measurement takes place with a CPE-41 cone at 25° C. The solids concentration of the partially hydrogenated NBR rubber and of NBR rubbers measured for comparison in the monochlorobenzene solvent is 12% by weight. The rotational speed is set such that measurement takes place at the maximum possible torque. The characteristic SV/Mw can be calculated from the values determined in this way.

Vulcanizable Mixtures:

The invention further provides vulcanizable mixtures comprising (i) at least one partially hydrogenated nitrile rubber having a degree of hydrogenation in the range from 50% to 97%, a ratio of solution viscosity (SV) divided by the weight average of the molecular weight (Mw) in the range from $4*10^{-3}$ to $50*10^{-3}$ Pa*s*mol/kg, and (ii) at least one peroxidic crosslinking system.

Provided, additionally, are vulcanizable mixtures comprising (i) at least one partially hydrogenated nitrile rubber having a degree of hydrogenation in the range from 50% to 97%, a ratio of solution viscosity (SV) divided by the weight average of the molecular weight (Mw) in the range from $4*10^{-1}$ to $30*10^{-3}$ Pa*s*mol/kg, and (ii) at least one peroxidic crosslinking system.

Additionally, the vulcanizable mixtures may further comprise one or more other customary additives.

These vulcanizable mixtures are typically prepared by mixing the above-prepared rubber blend (i) with at least one peroxidic crosslinking system (ii) and optionally with the further additives.

In the peroxidic crosslinking system, examples of peroxidic crosslinkers that may be employed include bis(2,4-dichlorobenzyl)peroxide, dibenzoyl peroxide, bis(4-chlorobenzoyl)peroxide, 1,1-bis(t-butylperoxy)-3,3,5-trimethylcyclohexane, tert-butyl perbenzoate, 2,2-bis(t-butylperoxy)butene, 4,4-di-tert-butyl peroxynonylvalerate, dicumyl peroxide, 2,5-dimethyl-2,5-di(t-butylperoxy)hexane, tert-butyl cumyl peroxide, 1,3-bis(t-butylperoxyisopropyl)benzene, di-t-butyl peroxide and 2,5-dimethyl-2,5-di(t-butylperoxy)hex-3-yne.

In the peroxidic crosslinking system, in addition to the peroxidic crosslinkers, it may be advantageous to use further additions as well, which can be used to increase the crosslinking yield: examples of such additions include triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, Zn diacrylate, Zn dimethacrylate, 1,2-polybutadiene or N,N'-m-phenylenedimaleimide, suitably.

The total amount of the peroxidic crosslinking system is typically in the range from 0.1 to 100 parts by weight, preferably in the range from 0.5 to 75 parts by weight and more preferably in the range from 1 to 50 parts by weight, based on 100 parts by weight of the partially hydrogenated nitrile rubber. The amount of peroxidic crosslinker, i.e. of active substance, is in this case typically in the range from 0.5 to 15 parts by weight, preferably in the range from 1 to 12.5 parts by weight and more preferably in the range from 1.5 to 10 parts by weight, based on 100 parts by weight of the partially hydrogenated nitrile rubber.

Besides the addition of the peroxidic crosslinking system, the vulcanizable mixture may also comprise further customary rubber additives.

These additives include, for example, the typical substances that are well known to the skilled person, such as fillers, filler activators, vulcanization onset retarders, ozone protectants, ageing inhibitors, antioxidants, processing assistants, extender oils, plasticizers, reinforcing materials and mould release agents.

Examples of fillers which can be used include carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), silicates or microgels.

Filler activators include, in particular, organic silanes, such as, for example, vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecyl)methyldimethoxysilane. Further filler activators are, for example, surface-active substances such as triethanolamine and ethylene glycols having molecular weights of 74 to 10 000 g/mol. The amount of filler activators is typically 0 to 10 phr, based on the amount of the filler. Determining the appropriate amount of filler activator is familiar to the skilled person in dependence on the nature and amount of the filler.

In addition it is also possible to use vulcanization onset retarders. These include, for example, compounds as specified in WO-A-97101597 and U.S. Pat. No. 4,857,571. Preference is given to sterically hindered p-dialkylaminophenols, especially Ethanox 703 (Sartomer).

Examples of ageing inhibitors which can be added to the vulcanizable mixtures are as follows: polymerized 2,2,4-trimethyl-1,2-dihydroquinoline (TMQ), 2-mercaptobenzimidazole (MBI), methyl-2-mercaptobenzimidazole (MMBI) or zinc methylmercaptobenzimidazole (ZMMBI).

Alternatively it is also possible to use the following, albeit less preferred, ageing inhibitors: aminic ageing inhibitors in the form, for example, of mixtures of diaryl-p-phenylenediamines (DTPD), octylated diphenylamine (ODPA), phenyl-α-naphthylamine (PAN) and/or phenyl-β-naphthylamine (PBN). Preference is given to using those that are phenylenediamine-based. Examples of phenylenediamines are N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD) and N,N'-bis-1,4-(1,4-dimethylpentyl)-p-phenylenediamine (7PPD).

The ageing inhibitors are used typically in amounts of up to 10 parts by weight, preferably up to 5 parts by weight, more preferably 0.25 to 3 parts by weight, more particularly 0.4 to 1.5 parts by weight, based on 100 parts by weight of the sum of partially hydrogenated nitrile rubber and vinyl-containing silicone rubber.

Examples of mould release agents contemplated include the following: saturated and partially unsaturated fatty acids and oleic acids and their derivatives (fatty acid esters, fatty acid salts, fatty alcohols, fatty acid amides), which are used preferably as a mixture constituent, and also products which can be applied to the mould surface, such as, for example, products based on low molecular weight silicone compounds, products based on fluoropolymers and products based on phenolic resins.

The mould release agents are used typically in amounts of around 0 to 10 parts by weight, preferably 0.5 to 5 parts by weight, based on 100 parts by weight of the sum of partially hydrogenated nitrile rubber and vinyl-containing silicone rubber.

Also possible is reinforcement with strengtheners (fibres) of glass, in accordance with the teaching of U.S. Pat. No. 4,826,721, and also reinforcement using cords, woven fabrics, fibres of aliphatic and aromatic polyamides (Nylon®, Aramid®), polyesters and natural fibre products.

The invention further provides a process for preparing vulcanizates which is characterized in that the above-described vulcanizable mixture is crosslinked by an increase in temperature, preferably in a shaping process, more preferably using injection moulding.

The invention therefore also provides the vulcanizate, preferably in the form of a moulding, which is obtainable by the aforesaid vulcanization process.

This vulcanization process can be used to produce a large number of mouldings, examples being seals, caps, hoses or membranes. More particularly it is possible to produce O-ring seals, flat seals, corrugated gaskets, sealing sleeves, sealing caps, dust protection caps, plug seals, thermal insulation hoses, oil cooler hoses, air intake hoses, servocontrol hoses or pump diaphragms.

EXAMPLES

A Partially Hydrogenated Nitrile Rubbers, Catalysts, Other Auxiliaries

In the examples which follow, the metathesis catalysts listed in Table 1 and also the partially hydrogenated NBR rubbers listed in Table 2, plus an NBR rubber (for comparative tests), were used.

TABLE 1

Metathesis catalysts used

| Identification of catalyst | Structural formula | Molecular weight [g/mol] | Source |
| --- | --- | --- | --- |
| GrubbsII catalyst | Mes—N⌒N—Mes, C, Cl/Ru=CHPh, Cl, PCy₃ | 848.33 | from Materia/ Pasadena; USA |
| Grubbs-Hoveyda catalyst | Mes—N⌒N—Mes, C, Cl/Ru=CH-(2-OiPr-C₆H₄), Cl | 626.14 | Aldrich |
| Grela catalyst | Mes—N⌒N—Mes, C, Cl/Ru=CH-(2-OiPr-5-NO₂-C₆H₃), Cl | 671.13 | Prepared as per J. Org. Chem. 2004, 69, 6894-6896 |

TABLE 1-continued

Metathesis catalysts used

| Identification of catalyst | Structural formula | Molecular weight [g/mol] | Source |
|---|---|---|---|
| GrubbsIII ctalyst | (structure: Ru complex with mesityl-substituted imidazolidine, two Cl, two 3-bromopyridine ligands, and benzylidene) | 884.54 | Aldrich |

TABLE 2

Nitrile rubber ("NBR") and partially hydrogenated nitrile rubber ("PH-NBR") used

| Rubber used[4] | ACN content[*5] [% by wt] | ML1 + 4 (100° C.) [MU] | Degree of hydrogenation [%] | Vinyl content [%] | $M_w$ [kg/mol] | $M_n$ [kg/mol] | PDI[*1] | Solution viscosity SV) [*3] [Pa * s] | $SV/M_w$ [Pa * s * mol/kg] | Source [*2] |
|---|---|---|---|---|---|---|---|---|---|---|
| Perbunan ® NT 3435 | 34 | 35 | 0 | 10 | 223 | 69.4 | 3.2 | 1.3 | 5.83 * 10$^{-3}$ | LXS |
| PH-NBR 1 | 34 | not measured | 46 | 0 | 265 | 88.4 | 3.0 | 1.81 | 6.83 * 10$^{-3}$ | Lab |
| PH-NBR 2 | 34 | 59.1 | 65.4 | 0 | 177 | 56.7 | 3.1 | 5.37 | 30.3 * 10$^{-3}$ | Lab |
| PH-NBR 3 | 34 | 64.8 | 74.8 | 0 | 196 | 57.5 | 3.4 | 6.94 | 35.3 * 10$^{-3}$ | Lab |
| PH-NBR 4 (Therban ® VP KA 8837) | 34 | 55 | 82 | 0 | 194 | 63.3 | 3.0 | 6.03 | 31.1 * 10$^{-3}$ | LXS |
| PH-NBR 5 | 34 | 74.5 | 89.8 | 0 | 187 | 62.6 | 2.9 | 10.7 | 57.3 * 10$^{-3}$ | Lab |
| PH-NBR 6 (Therban ® LT 2157) | 21 | 70 | 94.5 | 0 | 283 | 54.2 | 5.2 | 16.1 | 56.9 * 10$^{-3}$ | LXS |

[1]PDI = $M_w/M_n$
[2]"LXS" denotes available commercially from Lanxess Deutschland GmbH, "Lab" denotes preparation in the laboratory as indicated below
[3]Solution viscosity determined as indicated in section C2 of the examples.
[4]All of the rubber grades used were copolymers based on butadiene and acrylonitrile. In the case of Therban ® LT 2157, n-butyl acrylate is present additionally as termonomer.
[5]"ACN" stands for acrylonitrile The laboratory preparation of the partially hydrogenated nitrile rubbers PH-NBR 1, 2, 3 and 5 was carried out by hydrogenation of Perbunan® 3435 under the process conditions set out in table 3.

TABLE 3

Process conditions for the hydrogenations

| | PH-NBR1 | PH-NBR2 | PH-NBR3 | PH-NBR 5 |
|---|---|---|---|---|
| NBR concentration | 13% by wt. | 13% by wt. | 15% by wt. | 15% by wt. |
| Hydrogen pressure | 16 bar | 21 bar | 84 bar | 84 bar |
| Stirring speed | 600 min$^{-1}$ | 600 min$^{-1}$ | 600 min$^{-1}$ | 600 min$^{-1}$ |
| Temperature | 120-138° C. | 120-138° C. | 120-138° C. | 120-138° C. |
| Tris(triphenylphosphane)rhodium(I) chloride | 0.020 phr | 0.020 phr | 0.025 phr | 0.030 phr |
| Triphenylphosphane | 1.0 phr | 1.0 phr | 1.0 phr | 1.0 phr |
| Reactor fill level | 50% | 50% | 50% | 50% |

First of all, a solution of Perbunan® 3435 in monochlorobenzene was prepared at room temperature until the nitrile rubber had completely dissolved. This solution was then heated at the stirring speed indicated in Table 3, the solutions of the tris(triphenylphosphane)rhodium(I) chloride catalyst and of the triphenylphosphane cocatalyst in monochlorobenzene were added, and the system was subjected to hydrogen up to the pressure indicated in Table 3. The course of hydrogenation was monitored successively by the taking and analysis of samples. The hydrogenations were arrested at the degrees of hydrogenation indicated in Table 2, by discharge of the hydrogen. Residual hydrogen was removed by introduction of nitrogen, and the reaction mixture was cooled to room temperature. The solutions obtained were subsequently stabilized with 0.2 phr of Vulkanox® BKF (bisphenol-type antioxidant from Lanxess Deutschland GmbH). The partially hydrogenated nitrile rubbers were isolated from the organic solution by steam distillation. The moist partially hydrogenated nitrile rubber crumbs, with residual moisture contents in the region of about 50-60% by weight, were mechanically comminuted by drop formation and squeezing, and were dried to constant weight under reduced pressure in a vacuum drying cabinet at 50° C.

B General Description of the Metathesis Reactions

All of the metathesis reactions in the examples below were carried out in solution using monochlorobenzene (from Aldrich) ("MCB") as solvent. Prior to being used, MCB was distilled and inertized by passage of argon at room temperature. The amounts of nitrile rubber specified in the tables below were dissolved in MCB at room temperature with stirring for a period of 12 hours. The nitrile rubber-containing solution was admixed with the additions noted in the tables (without dilution), and was stirred for 30 minutes for homogenization. The chlorobenzenic nitrile rubber solutions were heated to the temperatures stated in the tables before the catalyst was added. All of the reaction batches were designed such that the nitrile rubber concentration following addition of catalyst was 12% by weight.

Unless indicated otherwise in the specific experimental tables, the metathesis catalysts specified in Table 1 were each dissolved in 10 g of inertized MCB under argon, the catalyst solutions being added to the NBR solutions immediately after the catalyst solutions had been prepared.

The metathesis was carried out with the amounts of reactants and with the temperatures stated in the tables below. During the reaction times, samples were taken off the reaction solutions, after the times indicated in the tables, for analytical investigations. To determine the molar masses ($M_w$ and $M_n$) by GPC, about 3 ml of each reaction mixture was taken, and was arrested by immediate addition of about 0.2 ml of ethyl vinyl ether.

C Analysis

C.1 GPC Determination of $M_w$ and $M_n$ in the Course of Metathesis

For the GPC analysis, 0.2 ml was taken from the nitrile rubber solutions arrested with ethyl vinyl ether, and diluted with 3 ml of N,N'-dimethylacetamide (from Acros Organics with 5 g/l LiBr added). Before the GPC analysis was carried out, these solutions were filtered in each case using a 0.2 μm syringe filter made of Teflon (Chromafil PTFE 0.2 μm; from Macherey-Nagel). After that, GPC analysis was carried out using an instrument from Waters, fitted with a Waters 717 autosampler, a PSS Gram 10 μm 8×50 mm preliminary column, a PSS Gram-30 10 μm 8×300 mm column and two PSS Gram-1000 10 μm 8×300 mm columns from Polymer Standards Service, a Waters 410 RI detector and Cirrus Software Multi Version 3.0. The columns were calibrated with linear polymethyl methacrylate with molar masses of 600 to 1.64·10$^6$ g/mol from Polymer Standards Service. The measurements were carried out with a flow rate of 1.0 mL/min at 80° C. using N,N'-dimethylacetamide (with 5 g/L LiBr) as eluent.

C.2 Determination of the Solution Viscosity ("SV")

The solution viscosity was determined on a cone/plate rheometer (Brookfield RVDV-III UCP) from Brookfield (Lorch). After the reaction times indicated in the tables below, 2 ml was taken from each of the reaction solutions, and the solution viscosity was determined immediately thereafter. The measurement took place place with a CPE-41 cone at 25° C. The solids concentration of the partially hydrogenated NBR rubber and of the NBR rubber measured for comparison in the monochlorobenzene solvent was 12% by weight. The rotational speed was set such that measurement took place at the maximum possible torque.

D Experimental Series 1 and 2

Experimental series 1 comprises the non-inventive examples (Table 4), experimental series 2 the inventive examples (Table 5). All of the examples in experimental series 2 were carried out without addition of a co-olefin.

TABLE 4

Experimental series 1 (non-inventive examples)

| | Nitrile rubber | | | | Grubbs II catalyst | | | |
|---|---|---|---|---|---|---|---|---|
| Example | Type | ACN content [% by wt.] | Degree of hydrogenation [%] | SV/$M_w$ (Nitrile rubber before metathesis)*1) | Amount of Ru relative to amount of rubber [ppm] | Olefin addition Type and amount | Temperature [° C.] | SV/$M_w$ (Nitrile rubber after metathesis)*1) |
| 1.01 | Perbunan ® NT 3435 | 34 | 0 | 5.83 * 10$^{-3}$ | 59.6 | — | 25 | 2.29 * 10$^{-3}$ |
| 1.02 | Perbunan ® NT 3435 | 34 | 0 | 5.83 * 10$^{-3}$ | 59.6 | 1-Hexene; 2 phr | 25 | 0.80 * 10$^{-3}$ |
| 1.03 | Perbunan ® NT 3435 | 34 | 0 | 5.83 * 10$^{-3}$ | 119.1 | — | 80 | 0.59 * 10$^{-3}$ |
| 1.04 | PH-NBR 1 | 34 | 46 | 6.83 * 10$^{-3}$ | 59.6 | — | 25 | 3.19 * 10$^{-3}$ |
| 1.05 | PH-NBR 4 Therban ® VP KA 8837 | 34 | 82 | 31.1 * 10$^{-3}$ | 59.6 | 1-Hexene; 2 phr | 25 | 1.68 * 10$^{-3}$ |

*1)expressed in [Pa * s * mol/kg]

The nitrile rubbers (Examples 1.01-1.03) and partially hydrogenated nitrile rubbers (Examples 1.04 and 1.05) obtained in experimental series 1 under non-inventive conditions possess SV/Mw indexes in the range from $0.59*10^{-3}$ to $3.19*10^{-3}$ Pa*s*mol/kg.

In Example 1.01 and Example 1.03, starting from Perbunan® NT 3435 as non-partially hydrogenated nitrile rubber with an SV/Mw ratio of $5.83*10^{-3}$ Pa*s*mol/kg, a metathetic degradation was carried out without addition of an olefin, to give an unhydrogenated nitrile rubber with an SV/Mw ratio of $2.29*10^{-3}$ Pa s*mol/kg (Example 1.01) and $0.59*10^{3}$ Pa*s mol/kg (Example 1.03). Example 1.03 was carried out with twice the amount of catalyst and at a temperature of 80° C.

In Example 1.02, again starting from Perbunan® NT 3435, metathesis with addition of 1-hexene gave a non-partially hydrogenated nitrile rubber with an SV/Mw ratio of $0.80*10^{-3}$P mol/kg.

In Example 1.04, using a partially hydrogenated nitrile rubber having a degree of hydrogenation of 46% ("PH-NBR 1"), without addition of 1-olefin, a partially hydrogenated nitrile rubber was obtained with an $SV/M_w$ ratio of $3.19*10^{-3}$ Pa*s*mol/kg.

In Example 1.05 using a partially hydrogenated nitrile rubber PH-NBR 4 (Therban® VP KA 8837) having a degree of hydrogenation of 82%, the metathesis with Grubbs II catalyst with addition of 1-hexene gave a partially hydrogenated nitrile rubber h an $SV/M_w$ ratio of $1.68*10^{-3}$P*s*mol/kg.

In Experimental series 2 (see Table 5 below), the metathesis of the invention using a correspondingly partially hydrogenated nitrile rubber without addition of an olefin produced partially hydrogenated nitrile rubbers with a solution viscosity/molar mass weight average ($SV/M_w$) ratio in the range of $6.9*10^{-3}$ to $26.8*10^{-3}$ Pa*s*mol/kg. The attainment of these ($SV/M_w$) ratios is independent of the type of catalyst used (Grubbs II catalyst, Grubbs III catalyst, Grela catalyst or Grubbs-Hoveyda catalyst), and of the optional addition of salts such as $CaCl_{2*2}H_2O$ or $Ti(OiPr)_4$.

TABLE 5

Experimental series 2 (inventive examples)

| | Partially hydrogenated nitrile rubber | | | | Metathesis catalyst | | Salt addition | | | $SV/M_w$ |
|---|---|---|---|---|---|---|---|---|---|---|
| Example | Type | ACN content [% by wt.] | Degree of hydrogenation [%] | $SV/M_w$ (partially hydrogenated nitrile rubber)*1) | Type | Amount of ruthenium based on amount of rubber [ppm] | Type | Amount based on amount of catalyst [eq] | Temperature [° C.] | (partially hydrogenated nitrile rubber after metathesis)*1) |
| 2.01 | PH-NBR 4 | 34 | 82 | $31.1 * 10^{-3}$ | Grubbs II | 59.6 | — | — | 25 | $17.9 * 10^{-3}$ |
| 2.02 | PH-NBR 3 | 34 | 74.8 | $35.3 * 10^{-3}$ | Grubbs II | 59.6 | — | — | 25 | $12.5 * 10^{-3}$ |
| 2.03 | PH-NBR 2 | 34 | 65.4 | $30.3 * 10^{-3}$ | Grubbs II | 59.6 | — | — | 25 | $9.22 * 10^{-3}$ |
| 2.04 | PH-NBR 4 | 34 | 82 | $31.1 * 10^{-3}$ | Grubbs III | 59.5 | — | — | 25 | $17.7 * 10^{-3}$ |
| 2.05 | PH-NBR 4 | 34 | 82 | $31.1 * 10^{-3}$ | Grela | 59.7 | — | — | 25 | $16.6 * 10^{-3}$ |
| 2.06 | PH-NBR 4 | 34 | 82 | $31.1 * 10^{-3}$ | Hoveyda | 59.7 | — | — | 25 | $22.5 * 10^{-3}$ |
| 2.07 | PH-NBR 4 | 34 | 82 | $31.1 * 10^{-3}$ | Grubbs II | 178.7 | — | — | 25 | $14.2 * 10^{-3}$ |
| 2.08 | PH-NBR 4 | 34 | 82 | $31.1 * 10^{-3}$ | Grubbs II | 59.6 | — | — | 40 | $13.9 * 10^{-3}$ |
| 2.09 | PH-NBR 4 | 34 | 82 | $31.1 * 10^{-3}$ | Grubbs II | 59.6 | — | — | 60 | $14.3 * 10^{-3}$ |
| 2.10 | PH-NBR 4 | 34 | 82 | $31.1 * 10^{-3}$ | Grubbs II | 59.6 | — | — | 80 | $12.0 * 10^{-3}$ |
| 2.11 | PH-NBR 4 | 34 | 82 | $31.1 * 10^{-3}$ | Grubbs II | 119.1 | — | — | 80 | $10.0 * 10^{-3}$ |
| 2.12 | PH-NBR 4 | 34 | 82 | $31.1 * 10^{-3}$ | Grubbs II | 178.7 | — | — | 80 | $6.93 * 10^{-3}$ |
| 2.13 | PH-NBR 4 | 34 | 82 | $31.1 * 10^{-3}$ | Grubbs II | 59.6 | $CaCl_2*2H_2O$ | 100 | 25 | $17.5 * 10^{-3}$ |
| 2.14 | PH-NBR 4 | 34 | 82 | $31.1 * 10^{-3}$ | Grubbs II | 59.6 | $Ti(OiPr)_4$ | 100 | 25 | $17.3 * 10^{-3}$ |
| 2.15 | PH-NBR 5 | 34 | 89.8 | $57.3 * 10^{-3}$ | Grubbs II | 59.6 | — | — | 25 | $26.8 * 10^{-3}$ |
| 2.16 | PH-NBR 6 | 21 | 94.5 | $56.9 * 10^{-3}$ | Grubbs II | 59.6 | — | — | 25 | $15.1 * 10^{-3}$ |
| 2.17 | PH-NBR 6 | 21 | 94.5 | $56.9 * 10^{-3}$ | Grubbs II | 178.7 | — | — | 80 | $8.70 * 10^{-3}$ |

*1)stated in [Pa * s * mol/kg]

Experimental Series 1

Non-Inventive Examples 1.01. Reaction of Perbunan® NT 3435 (NBR, not Hydrogenated) with Grubbs II Catalyst

| Rubber: | ACN content [% by wt.] | Degree of hydrogenation [%] | Amount [g] |
|---|---|---|---|
| Perbunan ® NT 3435 | 34 | 0 | 40 |

| Catalyst | Amount [mg] | Amount of ruthenium based on amount of rubber [ppm] | Olefin Type | Amount [phr] | Temperature [° C.] |
|---|---|---|---|---|---|
| Grubbs II | 20 | 59.6 | — | — | 25 |

| Analytical data | Reaction time/min | | | | | |
|---|---|---|---|---|---|---|
| | 0 | 15 | 60 | 180 | 420 | 1440 |
| $M_w$ [kg/mol] | 223 | 218 | 202 | 151 | 149 | 145 |
| $M_n$ [kg/mol] | 69.4 | 78.5 | 75.4 | 67.2 | 65.5 | 64.3 |
| PDI | 3.2 | 2.8 | 2.7 | 2.3 | 2.3 | 2.3 |
| SV [Pa s] | 1.30 | 1.06 | 0.805 | 0.495 | 0.367 | 0.332 |
| $SV/M_w$ [Pa*s*mol/kg] | $5.83 \cdot 10^{-3}$ | $4.84 \cdot 10^{-3}$ | $3.97 \cdot 10^{-3}$ | $3.26 \cdot 10^{-3}$ | $2.47 \cdot 10^{-3}$ | $2.29 \cdot 10^{-3}$ |

1.02. Reaction of Perbunan® NT 3435 (NBR not Hydrogenated) with Grubbs II Catalyst

| Rubber: | ACN content [% by wt.] | Degree of hydrogenation [%] | Amount [g] |
|---|---|---|---|
| Perbunan ® NT 3435 | 34 | 0 | 30 |

| Catalyst | Amount [mg] | Amount of ruthenium based on amount of rubber [ppm] | Olefin Type | Amount [phr] | Temperature [° C.] |
|---|---|---|---|---|---|
| Grubbs II | 15 | 59.6 | 1-Hexene | 2 | 25 |

| Analytical data | Reaction time/min | | | | |
|---|---|---|---|---|---|
| | 0 | 30 | 60 | 180 | 420 |
| $M_w$ [kg/mol] | 223 | 166 | 120 | 79.4 | 62.4 |
| $M_n$ [kg/mol] | 69.4 | 66.0 | 55.8 | 44.5 | 35.5 |
| PDI | 3.2 | 2.5 | 2.2 | 1.8 | 1.8 |
| SV [Pa s] | 1.30 | 0.61 | 0.20 | 0.08 | 0.05 |
| $SV/M_w$ [Pa*s*mol/kg] | $5.83 \cdot 10^{-3}$ | $3.67 \cdot 10^{-3}$ | $1.67 \cdot 10^{-3}$ | $1.01 \cdot 10^{-3}$ | $0.80 \cdot 10^{-3}$ |

1.03 Reaction of Perbunan® NT 3435 (NBR not Hydrogenated with Grubbs II Catalyst

| Rubber: | ACN content [% by wt.] | Degree of hydrogenation [%] | Amount [g] |
|---|---|---|---|
| Perbunan ® NT 3435 | 34 | 0 | 30 |

| Catalyst | Amount [mg] | Amount of ruthenium based on amount of rubber [ppm] | Olefin Type | Amount [phr] | Temperature [° C.] |
|---|---|---|---|---|---|
| Grubbs II | 30 | 119.1 | — | — | 80 |

| Analytical data | Reaction time/min | | | | |
|---|---|---|---|---|---|
| | 0 | 30 | 60 | 180 | 420 |
| $M_w$ [kg/mol] | 223 | 50.5 | 49.7 | 49.2 | 49.2 |
| $M_n$ [kg/mol] | 69.4 | 31.9 | 31.3 | 30.2 | 29.7 |

-continued

| Analytical data | Reaction time/min | | | | |
|---|---|---|---|---|---|
| | 0 | 30 | 60 | 180 | 420 |
| PDI | 3.2 | 1.6 | 1.6 | 1.6 | 1.6 |
| SV [Pa s] | 1.30 | 0.03 | 0.03 | 0.03 | 0.03 |
| SV/$M_w$ [Pa*s*mol/kg] | $5.83 \cdot 10^{-3}$ | $0.60 \cdot 10^{-3}$ | $0.60 \cdot 10^{-3}$ | $0.59 \cdot 10^{-3}$ | $0.59 \cdot 10^{-3}$ |

1.04 Reaction of PH-NBR1 with Grubbs II Catalyst

| Rubber: | ACN content [% by wt.] | Degree of hydrogenation [%] | Amount [g] |
|---|---|---|---|
| PH-NBR 1 | 34 | 46 | 40 |

| Catalyst | Amount [mg] | Amount of ruthenium based on amount of rubber [ppm] | Olefin Type | Amount [phr] | Temperature [° C.] |
|---|---|---|---|---|---|
| Grubbs II | 20 | 59.6 | — | — | 25 |

| Analytical data | Reaction time/min | | | | | |
|---|---|---|---|---|---|---|
| | 0 | 15 | 60 | 180 | 420 | 1440 |
| $M_w$ [kg/mol] | 265 | 233 | 219 | 193 | 187 | 173 |
| $M_n$ [kg/mol] | 88.4 | 97.3 | 96.7 | 92.6 | 82.7 | 80.1 |
| PDI | 3.0 | 2.4 | 2.3 | 2.1 | 2.3 | 2.2 |
| SV [Pa s] | 1.81 | 1.56 | 1.27 | 0.803 | 0.605 | 0.552 |
| SV/$M_w$ [Pa*s*mol/kg] | $6.83 \cdot 10^{-3}$ | $6.69 \cdot 10^{-3}$ | $5.80 \cdot 10^{-3}$ | $4.16 \cdot 10^{-3}$ | $3.24 \cdot 10^{-3}$ | $3.19 \cdot 10^{-3}$ |

1.05 Reaction of PH-NBR 4 Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Olefin Type | Amount [phr] | Temperature [° C.] |
|---|---|---|---|---|---|
| Grubbs II | 15 | 59.6 | 1-Hexene | 2 | 25 |

| Analytical data | Reaction time/min | | | | |
|---|---|---|---|---|---|
| | 0 | 30 | 60 | 180 | 420 |
| $M_w$ [kg/mol] | 194 | 155 | 107 | 61.2 | 47.5 |
| $M_n$ [kg/mol] | 63.3 | 63.2 | 52.1 | 33.9 | 29.4 |
| PDI | 3.0 | 2.5 | 2.1 | 1.8 | 1.6 |
| SV [Pa s] | 6.03 | 2.38 | 0.71 | 0.14 | 0.08 |
| SV/$M_w$ [Pa*s*mol/kg] | $31.1 \cdot 10^{-3}$ | $15.4 \cdot 10^{-3}$ | $6.64 \cdot 10^{-3}$ | $2.29 \cdot 10^{-3}$ | $1.68 \cdot 10^{-3}$ |

Experimental Series 2

Inventive Examples 2.01 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 25 |

| Analytical data | Reaction time/min | | | | |
|---|---|---|---|---|---|
| | 0 | 30 | 60 | 180 | 420 |
| $M_w$ [kg/mol] | 194 | 176 | 169 | 163 | 156 |
| $M_n$ [kg/mol] | 63.3 | 62.6 | 61.7 | 64.6 | 65.7 |
| PDI | 3.0 | 2.8 | 2.7 | 2.5 | 2.4 |
| SV [Pa s] | 6.03 | 5.67 | 4.97 | 3.69 | 2.80 |
| $SV/M_w$ [Pa*s*mol/kg] | $31.1 \cdot 10^{-3}$ | $31.2 \cdot 10^{-3}$ | $29.4 \cdot 10^{-3}$ | $22.6 \cdot 16^{-3}$ | $17.9 \cdot 10^{-3}$ |

2.02 Reaction of PH-NBR 3 with Grubbs II Catalyst

| Rubber: PH-NBR 3 | ACN content [% by wt.] | Degree of hydrogenation [%] | Amount [g] |
|---|---|---|---|
| Partially Hydrogenated NBR | 34 | 74.8 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 25 |

| Analytical data | Reaction time/min | | | | |
|---|---|---|---|---|---|
| | 0 | 30 | 60 | 180 | 420 |
| $M_w$ [kg/mol] | 196 | 192 | 174 | 150 | 142 |
| $M_n$ [kg/mol] | 57.5 | 59.8 | 60.0 | 61.2 | 56.6 |
| PDI | 3.4 | 3.2 | 2.9 | 2.4 | 2.5 |
| SV [Pa s] | 6.94 | 5.39 | 4.04 | 2.31 | 1.77 |
| $SV/M_w$ [Pa*s*mol/kg] | $35.3 \cdot 10^{-3}$ | $28.1 \cdot 10^{-3}$ | $23.3 \cdot 10^{-3}$ | $15.4 \cdot 10^{-3}$ | $12.5 \cdot 10^{-3}$ |

2.03 Reaction of PH-NBR 2 with Grubbs II Catalyst

| Rubber: PH-NBR 2 | ACN content [% by wt.] | Degree of hydrogenation [%] | Amount [g] |
|---|---|---|---|
| Partially hydrogenated NBR | 34 | 65.4 | 30 |

| Catalyst | Amount [mg] | Amount of ruthenium based on amount of rubber [ppm] | Addition Type | Addition Amount [phr] | Temperature [° C.] |
|---|---|---|---|---|---|
| Grubbs II | 15 | 59.6 | — | — | 25 |

| Analytical data | Reaction time/min | | | | |
|---|---|---|---|---|---|
| | 0 | 30 | 60 | 180 | 420 |
| $M_w$ [kg/mol] | 177 | 177 | 167 | 148 | 131 |
| $M_n$ [kg/mol] | 56.7 | 58.8 | 53.5 | 58.0 | 58.1 |
| PDI | 3.1 | 3.0 | 3.1 | 2.6 | 2.3 |
| SV [Pa s] | 5.37 | 4.45 | 3.39 | 1.73 | 1.21 |
| $SV/M_w$ [Pa*s*mol/kg] | $30.3 \cdot 10^{-3}$ | $25.1 \cdot 10^{-3}$ | $20.3 \cdot 10^{-3}$ | $11.7 \cdot 10^{-3}$ | $9.22 \cdot 10^{-3}$ |

2.04 Reaction of PH-NBR 4 with Grubbs III Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Addition Amount [phr] | Temperature [° C.] |
|---|---|---|---|---|---|
| Grubbs III | 15.6 | 59.5 | — | — | 25 |

| Analytical data | Reaction time/min | | | | |
|---|---|---|---|---|---|
| | 0 | 30 | 60 | 180 | 420 |
| $M_w$ [kg/mol] | 194 | 209 | 194 | 170 | 167 |
| $M_n$ [kg/mol] | 63.3 | 70.3 | 71.8 | 65.6 | 68.4 |
| PDI | 3.0 | 3.0 | 2.7 | 2.6 | 2.4 |
| SV [Pa a] | 6.03 | 4.96 | 3.77 | 3.40 | 2.95 |
| $SV/M_w$ [Pa*s*mol/kg] | $31.1 \cdot 10^{-3}$ | $23.7 \cdot 10^{-3}$ | $19.4 \cdot 10^{-3}$ | $20.0 \cdot 10^{-3}$ | $17.7 \cdot 10^{-3}$ |

2.05 Reaction of PH-NBR 4 with Grela Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Addition Amount [phr] | Temperature [c] |
|---|---|---|---|---|---|
| Grela | 11.9 | 59.7 | — | — | 25 |

| Analytical data | Reaction time/min | | | | |
|---|---|---|---|---|---|
| | 0 | 30 | 60 | 180 | 420 |
| $M_w$ [kg/mol] | 194 | 192 | 188 | 160 | 163 |
| $M_n$ [kg/mol] | 63.3 | 65.4 | 65.4 | 64.0 | 71.3 |
| PDI | 3.0 | 3.1 | 2.9 | 2.5 | 2.3 |
| SV [Pa s] | 6.03 | 5.84 | 4.81 | 3.12 | 2.70 |
| $SV/M_w$ [Pa*s*mol/kg] | $31.1 \cdot 10^{-3}$ | $30.4 \cdot 10^{-3}$ | $25.6 \cdot 10^{-3}$ | $19.5 \cdot 10^{-3}$ | $16.6 \cdot 10^{-3}$ |

2.06 Reaction of PH-NBR 4 with Grubbs-Hoveyda Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition | | Temperature [° C.] |
|---|---|---|---|---|---|
| | | | Type | Amount [phr] | |
| Grubbs-Hoveyda | 11.1 | 59.7 | — | — | 25 |

| Analytical data | Reaction time/min | | | | |
|---|---|---|---|---|---|
| | 0 | 30 | 60 | 180 | 420 |
| $M_w$ [kg/mol] | 194 | 187 | 194 | 189 | 163 |
| $M_n$ [kg/mol] | 63.3 | 67.2 | 71.3 | 69.0 | 69.5 |
| PDI | 3.0 | 2.8 | 2.7 | 2.7 | 2.6 |
| SV [Pa s] | 6.03 | 5.34 | 5.21 | 4.62 | 3.67 |
| $SV/M_w$ [Pa*s*mol/kg] | $31.1 \cdot 10^{-3}$ | $28.6 \cdot 10^{-3}$ | $26.9 \cdot 10^{-3}$ | $24.4 \cdot 10^{-3}$ | $22.5 \cdot 10^{-3}$ |

2.07 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition | | Temperature [° C.] |
|---|---|---|---|---|---|
| | | | Type | Amount [phr] | |
| Grubbs II | 45 | 178.7 | — | — | 25 |

| Analytical data | Reaction time/min | | | | |
|---|---|---|---|---|---|
| | 0 | 30 | 60 | 180 | 420 |
| $M_w$ [kg/mol] | 194 | 197 | 185 | 160 | 122 |
| $M_n$ [kg/mol] | 63.3 | 70.5 | 67.7 | 68.4 | 64.4 |
| PDI | 3.0 | 2.80 | 2.74 | 2.34 | 1.90 |
| SV [Pa s] | 6.03 | 5.25 | 4.56 | 2.49 | 1.73 |
| $SV/M_w$ [Pa*s*mol/kg] | $31.1 \cdot 10^{-3}$ | $26.6 \cdot 10^{-3}$ | $24.6 \cdot 10^{-3}$ | $15.6 \cdot 10^{-3}$ | $14.2 \cdot 10^{-3}$ |

2.08 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 40 |

| Analytical data | Reaction time/min | | | | |
|---|---|---|---|---|---|
| | 0 | 30 | 60 | 180 | 420 |
| $M_w$ [kg/mol] | 194 | 175 | 164 | 154 | 153 |
| $M_n$ [kg/mol] | 63.3 | 71.7 | 77.1 | 75.5 | 75.1 |
| PDI | 3.0 | 2.4 | 2.1 | 2.0 | 2.0 |
| SV [Pa s] | 6.03 | 3.81 | 2.67 | 2.23 | 2.13 |
| $SV/M_w$ [Pa*s*mol/kg] | $31.1 \cdot 10^{-3}$ | $21.7 \cdot 10^{-3}$ | $16.3 \cdot 10^{-3}$ | $14.5 \cdot 10^{-3}$ | $13.9 \cdot 10^{-3}$ |

2.09 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 60 |

| Analytical data | Reaction time/min | | | | |
|---|---|---|---|---|---|
| | 0 | 30 | 60 | 180 | 420 |
| $M_w$ [kg/mol] | 194 | 154 | 152 | 146 | 146 |
| $M_n$ [kg/mol] | 63.3 | 70.5 | 71.5 | 70.9 | 70.5 |
| PDI | 3.0 | 2.2 | 2.1 | 2.1 | 2.1 |
| SV [Pa s] | 6.03 | 243 | 2.20 | 2.14 | 2.10 |
| $SV/M_w$ [Pa*s*mol/kg] | $31.1 \cdot 10^{-3}$ | $15.8 \cdot 10^{-3}$ | $14.5 \cdot 10^{-3}$ | $14.6 \cdot 10^{-3}$ | $14.3 \cdot 10^{-3}$ |

2.10 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 80 |

| Analytical data | Reaction time/min | | | | |
|---|---|---|---|---|---|
| | 0 | 30 | 60 | 180 | 420 |
| $M_w$ [kg/mol] | 194 | 148 | 141 | 142 | 134 |
| $M_n$ [kg/mol] | 63.3 | 70.1 | 68.7 | 68.6 | 68.4 |
| PDI | 3.0 | 2.1 | 2.1 | 2.1 | 2.0 |
| SV [Pa s] | 6.03 | 1.77 | 1.70 | 1.64 | 1.61 |
| SV/$M_w$ [Pa*s*mol/kg] | $31.1 \cdot 10^{-3}$ | $12.0 \cdot 10^{-3}$ | $12.1 \cdot 10^{-3}$ | $11.5 \cdot 10^{-3}$ | $12.0 \cdot 10^{-3}$ |

2.11 Reaction of PH-NBR 4 with Grubbs II Catalyst

| Rubber: PH-NBR 4 | ACN content [% by wt] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 30 | 119.1 | — | — | 80 |

| Analytical data | Reaction time/min | | | | |
|---|---|---|---|---|---|
| | 0 | 30 | 60 | 180 | 420 |
| $M_w$ [kg/mol] | 194 | 122 | 117 | 118 | 116 |
| $M_n$ [kg/mol] | 63.3 | 49.8 | 49.4 | 52.7 | 51.6 |
| PDI | 3.0 | 2.4 | 2.4 | 2.2 | 2.2 |
| SV [Pa s] | 6.03 | 1.36 | 1.18 | 1.17 | 1.16 |
| SV/$M_w$ [Pa*s*mol/kg] | $31.1 \cdot 10^{-3}$ | $11.2 \cdot 10^{-3}$ | $10.0 \cdot 10^{-3}$ | $9.90 \cdot 10^{-3}$ | $10.0 \cdot 10^{-3}$ |

2.12 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 45 | 178.7 | — | — | 80 |

| Analytical data | Reaction time/min | | | | |
|---|---|---|---|---|---|
| | 0 | 30 | 60 | 180 | 420 |
| $M_w$ [kg/mol] | 194 | 132 | 128 | 122 | 127 |
| $M_n$ [kg/mol] | 63.3 | 71.8 | 69.9 | 70.0 | 69.1 |
| PDI | 3.0 | 1.8 | 1.8 | 1.7 | 1.8 |
| SV [Pa s] | 6.03 | 1.02 | 0.99 | 0.93 | 0.88 |
| SV/$M_w$ [Pa*s*mol/kg] | $31.1 \cdot 10^{-3}$ | $7.73 \cdot 10^{-3}$ | $7.73 \cdot 10^{-3}$ | $7.62 \cdot 10^{-3}$ | $6.93 \cdot 10^{-3}$ |

2.13 Reaction of PH-NBR 4 with Grubbs II Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | Amount [mg] | Amount of ruthenium based on amount of rubber [ppm] | Salt addition Type | Amount [eq. based on cat.] | Temperature [° C.] |
|---|---|---|---|---|---|
| Grubbs II | 15 | 59.6 | $CaCl_2 \cdot 2\,H_2O$ | 100 | 25 |

| Analytical data | Reaction time/min | | | | |
|---|---|---|---|---|---|
|  | 0 | 30 | 60 | 180 | 420 |
| $M_w$ [kg/mol] | 194 | 189 | 183 | 171 | 160 |
| $M_n$ [kg/mol] | 63.3 | 69.8 | 72.4 | 72.0 | 71.0 |
| PDI | 3.0 | 2.7 | 2.5 | 2.4 | 2.3 |
| SV [Pa s] | 6.03 | 5.67 | 4.97 | 3.69 | 2.80 |
| $SV/M_w$ [Pa*s*mol/kg] | $31.1 \cdot 10^{-3}$ | $30.0 \cdot 10^{-3}$ | $27.1 \cdot 10^{-3}$ | $21.5 \cdot 10^{-3}$ | $17.5 \cdot 10^{-3}$ |

2.14 Reaction of PH-NBR 4 with Grubbs H Catalyst

| Rubber: PH-NBR 4 | ACN content [% by wt.] | Degree of hydrogenation [%] | Amount [g] |
|---|---|---|---|
| Therban ® VP KA 8837 | 34 | 82 | 30 |

| Catalyst | | | | | |
|---|---|---|---|---|---|
| Grubbs II | Amount [mg] | Amount of ruthenium based on amount of rubber [ppm] | Salt addition Type | Amount [eq. based on cat.] | Temperature [° C.] |
|  | 15 | 59.6 | $Ti(OiPr)_4$ | 100 | 25 |

| Analytical data | Reaction time/min | | | | |
|---|---|---|---|---|---|
|  | 0 | 30 | 60 | 180 | 420 |
| $M_w$ [kg/mol] | 194 | 174 | 167 | 157 | 146 |
| $M_n$ [kg/mol] | 63.3 | 61.9 | 63.2 | 70.8 | 70.7 |
| PDI | 3.0 | 2.8 | 2.6 | 2.2 | 2.1 |
| SV [Pa s] | 6.03 | 6.00 | 5.52 | 3.69 | 2.53 |
| $SV/M_w$ [Pa*s*mol/kg] | $31.1 \cdot 10^{-3}$ | $34.4 \cdot 10^{-3}$ | $33.0 \cdot 10^{-3}$ | $23.4 \cdot 10^{-3}$ | $17.3 \cdot 10^{-3}$ |

2.15 Reaction of PH-NBR 5 with Grubbs II Catalyst

| Rubber: PH-NBR 5 | ACN content [% by wt.] | Degree of hydrogenation [%] | Amount [g] |
|---|---|---|---|
| Partially hydrogenated NBR | 34 | 89.8 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 25 |

| Analytical data | Reaction time/min | | | | |
|---|---|---|---|---|---|
| | 0 | 30 | 60 | 180 | 420 |
| $M_w$ [kg/mol] | 187 | 181 | 172 | 153 | 150 |
| $M_n$ [kg/mol] | 62.6 | 52.5 | 51.9 | 58.8 | 57.8 |
| PDI | 3.0 | 3.4 | 3.3 | 2.6 | 2.6 |
| SV [Pa s] | 10.7 | 9.63 | 8.35 | 4.85 | 4.02 |
| SV/$M_w$ [Pa*s*mol/kg] | $57.3 \cdot 10^{-3}$ | $53.3 \cdot 10^{-3}$ | $48.6 \cdot 10^{-3}$ | $31.7 \cdot 10^{-3}$ | $26.8 \cdot 10^{-3}$ |

2.16 Reaction of PH-NBR 6 with Grubbs II Catalyst

| Rubber: PH-NBR 6 | ACN content [% by wt] | Degree of hydrogenation [%] | Amount [g] |
|---|---|---|---|
| Therban ® LT 2157 | 21 | 94.5 | 30 |

| Catalyst | Amount [mg] | Amount of ruthenium based on amount of rubber [ppm] | Addition Type | Amount [phr] | Temperature [° C.] |
|---|---|---|---|---|---|
| Grubbs II | 15 | 59.6 | — | — | 25 |

| Analytical data | Reaction time/min | | | | |
|---|---|---|---|---|---|
| | 0 | 30 | 60 | 180 | 420 |
| $M_w$ [kg/mol] | 283 | 280 | 259 | 227 | 202 |
| $M_n$ [kg/mol] | 54.2 | 51.2 | 46.9 | 46.6 | 46.6 |
| PDI | 5.2 | 5.4 | 5.5 | 4.8 | 4.3 |
| SV [Pa s] | 16.1 | 14.9 | 12.9 | 7.04 | 3.06 |
| SV/$M_w$ [Pa*s*mol/kg] | $56.9 \cdot 10^{-3}$ | $53.1 \cdot 10^{-3}$ | $49.9 \cdot 10^{-3}$ | $30.9 \cdot 10^{-3}$ | $15.1 \cdot 10^{-3}$ |

2.17 Reaction of PH-NBR6 with Grubbs II Catalyst

| Rubber: PH-NBR 6 | ACN content [% by wt] | Degree of hydrogenation [%] | Amount [g] |
|---|---|---|---|
| Therban ® LT 2157 | 21 | 94.5 | 1213 |

| Catalyst | Amount [mg] | Amount of ruthenium based on amount of rubber [ppm] | Addition Type | Amount [phr] | Temperature [° C.] |
|---|---|---|---|---|---|
| Grubbs II | 1819 | 178.7 | — | — | 80 |

The catalyst in this example was dissolved in 50 ml of MCB and used directly after preparation of the solution.

After a reaction time of 7 hours, the batch was cooled to 45° C. and 20 ml of ethyl vinyl ether were added. The values determined were as follows:

| Analytical data | Reaction time/min | |
|---|---|---|
| | 0 | 420 |
| $M_w$ [kg/mol] | 283 | 131 |
| $M_n$ [kg/mol] | 54.2 | 44.5 |
| PDI | 5.2 | 2.9 |
| LV [Pa s] | 16.1 | 1.14 |
| LV/$M_w$ [Pa*s*mol/kg] | $56.9 \cdot 10^{-3}$ | $8.70 \cdot 10^{-3}$ |

The partially hydrogenated nitrile rubber obtained in inventive example 2.17 was isolated from the chlorobenzenic solution by steam distillation. After drying at 55° C. under reduced pressure, this partially hydrogenated nitrile rubber (referred to as the "crude rubber") was characterized by the Mooney viscosities of the 1 min (ML+1 at 100° C.) and after 4 min. (ML1+4 at 100° C.) and also by the Mooney relaxation after 10 and 30 seconds in accordance with ASTM D1646 (Table 6).

TABLE 6

Crude rubber properties

| | Example | |
|---|---|---|
| | Therban ® LT 2157 (PH-NBR 6) without metathesis | Therban ® LT 2157 (PH-NBR 6) after metathesis (inventive example 2.17) |
| ML 1 + 1 at 100° C. [MU] | 85.2 | 37.2 |
| ML 1 + 4 at 100° C. [MU] | 70.8 | 29.2 |
| Mooney relaxation/10 sec. [%] | 26.7 | 12.0 |
| Mooney relaxation/30 sec. [%] | 19.1 | 6.1 |
| Mooney relaxation/100 sec. [%] | 12.3 | 2.5 |

From Table 6 it is apparent that metathesis treatment of Therban™ LT 2157 without addition of olefin decreases the Mooney viscosity after 1 min. (ML1+1 at 100° C.) and after 4 min. (ML1+4 at 100° C.) and also the Mooney relaxations after 10 sec, 30 sec and 100 sec. These are key criteria for an improvement in the processing behaviour of the inventively produced rubber.

On the basis of the above rubbers Therban® LT 2157 and also the rubber obtained in Example 2.17, vulcanizable mixtures A and B, and vulcanizates, were produced.

The compositions of the rubber mixtures are summarized in Table 7.

TABLE 7

Composition of the rubber mixtures

| Mixture constituent | A (comparative) | A (inventive) |
|---|---|---|
| Therban ® LT 2157 (PH-NBR 6) | 100 | — |
| Therban LT 2157 (PH-NBR 6) after metathesis (Example 2.17) | — | 100 |
| Carbon black [1] | 45 | 45 |
| Octylated diphenylamine [2] | 1.43 | 1.43 |
| Zinc salt of methyl-2-mercaptobenzimidazole [3] | 0.4 | 0.4 |
| Magnesium oxide [4] | 2 | 2 |
| Zinc oxide [5] | 2 | 2 |
| Triallyl isocyanurate [6] | 3 | 3 |
| Di(tert-butylperoxyisopropyl)benzene [40% form] [7] | 7 | 7 |

[1] Corax ® N550 (Evonik - Degussa GmbH)
[2] Rhenofit ® DDA-70 (70% form; RheinChemie)
[3] Vulkanox ® ZMB2/C5 (Lanxess Deutschland GmbH)
[4] Maglite ® DE (Merck & Co. Inc. USA)
[5] Zinc oxide
[6] TAIC - 70 (Kettlitz Chemie GmbH & Co.)
[7] Perkadox ® 14-40 (in 40% form, supported on pale filler) (Akzo Nobel Chemicals GmbH)

The figures in Table 7 are parts by weight per 100 parts by weight of rubber. For the preparation of the rubber mixtures, a two-stage mixing procedure was used. The first mixing stage was carried out in an internal mixer with an internal volume of 1.5 l (GK 1.5 from Werner & Pfleiderer, Stuttgart, with intermeshing kneading elements (PS 5A—scoop geometry). In the internal mixer, all of the mixture constituents apart from triallyl isocyanurate and peroxide were mixed at a rotary speed of 40 min$^{-1}$ and a ram pressure of 6 bar at 50° C. The rubber was introduced in the internal mixer. After 60 seconds, ⅔ of the amount of carbon black were added with the other mixture constituents (apart from triallyl isocyanurate and di(tert-butylperoxyisopropyl) benzene). After 90 seconds, the remainder of the carbon black (⅓) was added and mixing was continued for 90 seconds.

Triallyl isocyanurate and di(tert-butylperoxyisopropyl) benzene (in 40% form ere added in the second mixing stage, which was carried out on a roll at a temperature of 40° C.

The processing behaviour of the unvulcanized rubber mixtures was assessed by determination of the Mooney viscosities after 1 min. (ML1+1/100° C.) and after 4 min. (ML1+4/100° C.) and also the Mooney relaxations after 10 sec., 30 sec. and 100 sec. in accordance with ASTM D1646 (Table 8).

TABLE 8

Mixture properties

| | Example | |
|---|---|---|
| | Using Therban ® LT 2157 (PH-NBR 6) (without metathesis) (comparative) | Using a Therban ® LT 2157 (PH-NBR 6) after metathesis (inventive example 2.17) |
| ML 1 + 1/100° C. [MU] | 110.0 | 77.9 |
| ML 1 + 4/100° C. [MU] | 96.1 | 66.3 |
| Mooney relaxation/10 sec. [%] | 12.57 | 4.62 |
| Mooney relaxation/30 sec. [%] | 12.6 | 4.6 |
| Mooney relaxation/100 sec. [%] | 8.45 | 2.18 |

From Table 8 it is apparent that the unvulcanized rubber mixture of the inventively produced example exhibits significantly lower mixture viscosities after 1 min (ML 1+1/100° C.) and after 4 min (ML 1+4/100° C.) and also reduced Mooney relaxations after 10, 30 and 100 seconds. On the basis of this data, the processing behaviour of the rubber mixture based on the inventively prepared rubber 2.17 is significantly improved.

The vulcanization behaviour of the rubber mixtures was determined at 180° C. in accordance with DIN 53 529, Part 3 using the Monsanto disc rheometer MDR 2000E at 1.7 Hz and 1° deformation. In this way, characteristic data such as $F_a$, $F_{max}$, $F_{max}$, $-F_a$, $t_{10}$, $t_{50}$, $t_{90}$ and $t_{95}$ were ascertained.

According to DIN 53 529, Part 3, these abbreviations have the following meanings:

$F_{min}$: vulcameter display at the minimum of the crosslinking isotherm $F_{max}$: vulcameter display at the maximum of the crosslinking isotherm $F_{max}-F_{min}$: difference in vulcameter displays between maximum and minimum $t_{10}$: time at which 10% of $F_{max}-F_{min}$ is achieved $t_{50}$: time at which 50% of $F_{max}-F_{min}$ is achieved $t_{90}$: time at which 90% of $F_{max}-F_{min}$ is achieved $t_{95}$: time at which 95% of $F_{max}-F_{min}$ is achieved The results of vulcameter testing are summarized in Table 9.

TABLE 9

Vulcanization behaviour of the rubber mixtures

| | Example | |
|---|---|---|
| | Therban LT 2157 (PH-NBR 6) without methathesis | Therban LT 2157 (PH-NBR 6) after metathesis (inventive example 2.17) |
| $F_{min}$ [dNm] | 2.16 | 0.89 |
| $F_{max}$ [dNm] | 23.78 | 21.4 |
| $F_{max} - F_{min}$ [dNm] | 21.62 | 20.51 |
| $t_{10}$ [sec] | 39 | 48 |
| $t_{50}$ [sec] | 122 | 140 |
| $t_{90}$ [sec] | 348 | 372 |
| $t_{95}$ [sec] | 454 | 481 |
| $t_{90} - t_{10}$ [sec] | 309 | 324 |

From Table 9 it is apparent that the vulcanization behaviour of the rubber mixture prepared on the basis of inventive rubber 2.17 is comparable with that of the reference mixtures. The test specimens needed for characterization of the vulcanizates were obtained by vulcanizing the rubber mixtures at 180° C./23 minutes under a hydraulic pressure of 120 bar.

The following properties, on the basis of the standards given below, were ascertained from the vulcanizates:
DIN 53505: Shore A hardness at 23° C. and 70° C.:
DIN 53512: Rebound elasticity at 23° C. ("R23") and 70° C. ("R70")
DIN 53504: Stress values at 10%, 25%, 50% and 100% strain ($\sigma_{10}$, $\sigma_{25}$, $\sigma_{50}$ and $\sigma_{100}$), tensile strength and elongation at break
DIN 53516: Abrasion The vulcanizate properties for the comparative example (Therban LT 2157 without metathesis) and for the inventive mixture 2.17 (Therban LT 2157 after metathesis) are summarized in Table 10 below.

TABLE 10

Vulcanizate properties

| | Example | |
|---|---|---|
| | Therban LT 2157 (PH-NBR 6) without metathesis | Therban LT 2157 (PH-NBR 6) after metathesis (inventive example 2.17) |
| Shore A hardness at 23° C. | 69.9 | 69.6 |
| Shore A hardness at 70° C. | 69.0 | 67.0 |
| Rebound elasticity/23° C. ("R23") [%] | 43.1 | 42.8 |
| Rebound elasticity/70° C. ("R70") [%] | 59.8 | 59.1 |
| $\sigma_{10}$ [MPa] | 0.7 | 0.7 |
| $\sigma_{25}$ [MPa] | 1.3 | 1.3 |
| $\sigma_{50}$ [MPa] | 2.4 | 2.5 |
| $\sigma_{100}$ [MPa] | 6.6 | 6.7 |
| Tensile strength [MPa] | 21.0 | 20.6 |
| Elongation at break [MPa] | 212 | 239 |
| Abrasion [mm³] | 77 | 79 |

Table 10 shows that the vulcanizate properties of inventive rubber 2.17 are comparable, within the margins of error of the respective measurement method, with those of the noninventive comparative example. It is a surprising result that, in spite of reduced viscosity, vulcanizates having equally excellent mechanical properties are obtained.

Dynamic Stressing in the Goodrich Flexometer:

To assess the dynamic behaviour of thick-walled articles, the vulcanizates were investigated in the Goodrich flexometer in accordance with DIN 53533 with a preliminary tension of 1.0 MPa and a stroke of 4.00 mm after an exposure time of 25 min/100° C. Parameters determined here were the temperature increase and also the permanent deformation (Table 11).

TABLE 11

Goodrich flexometer

| | Example | |
|---|---|---|
| | Therban LT 2157 without metathesis | Therban LT 2157 after metathesis |
| Temperature increase [° C.] | 29.8 | 30.9 |
| Permanent deformation [%] | 0.8 | 0.8 |

In the Goodrich flexometer test, the vulcanizate based on inventively prepared rubber 2.17 has properties that are comparable, within the margins of error of the Goodrich flexometer test, with those of the non-inventive, comparative example. This is an indication of a comparable lifetime of the two vulcanizates under dynamic load.

What is claimed is:

1. A partially hydrogenated nitrile rubber comprising:
   a degree of hydrogenation of 50% to 97%, and
   a ratio of solution viscosity (SV) to weight average of the molecular weight (Mw) of $4*10^{-3}$ to $30*10^{-3}$ Pa*s mol/kg.

2. The partially hydrogenated nitrile rubbers according to claim 1, wherein the degree of hydrogenation is 52.5% to 96.5%.

3. The partially hydrogenated nitrile rubbers according to claim 1, wherein the ratio of solution viscosity (SV) to the weight average of the molecular weight (Mw) is $5*10^{-3}$ to $30*10^{-3}$ Pa*s*mol/kg.

4. The partially hydrogenated nitrile rubbers according to claim 1 or 3, comprising repeating units derived from at least one conjugated diene and at least one α,β-unsaturated nitrile, wherein C=C double bonds of the copolymerized diene repeating units are 55% to 96% hydrogenated.

5. A process for preparing partially hydrogenated nitrile rubbers having a degree of hydrogenation of 50% to 97%, and a ratio of solution viscosity (SV) to weight average of the molecular weight (Mw) of $4*10^{-3}$ to $30*10^{-3}$ Pa*s*mol/kg, the process comprising subjecting partially hydrogenated nitrile rubbers having degrees of hydrogenation of 50% to 97% to a metathesis reaction in the presence of a complex catalyst based on a metal from transition group 6 or 8 of the Periodic Table and comprising at least one ligand attached carbenically to the metal, wherein the metathesis takes place substantially free from $C_2$-$C_{16}$ olefins.

6. The process according to claim 5, wherein the complex catalyst is a catalyst selected from the group consisting of:
   (i) catalysts of the general formula (A)

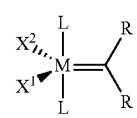

(A)

in which

M is osmium or ruthenium, $X^1$ and $X^2$ are identical or different and represent two ligands, L represents identical or different ligands, and R is identical or different at each occurrence and represents hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphinyl, optionally substituted in each case by one or more alkyl, halogen, alkoxy, aryl or heteroaryl radicals, or alternatively both radicals A are bridged with incorporation of the common C atom to which they are attached, to form a cyclic group, which may be aliphatic or aromatic in nature, is optionally substituted and may contain one or more heteroatoms, (ii) a catalyst which possesses the structure (IV) (Grubbs (I) catalyst) or (V) (Grubbs (II) catalyst), where Cy stands for cyclohexyl,

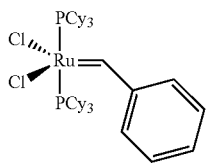

(IV)

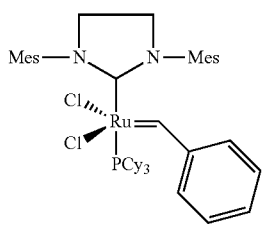

(V)

(iii) catalysts of the general formula (B)

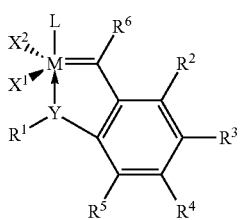

(B)

in which

M is ruthenium or osmium, $X^1$ and $X^2$ are identical or different ligands,

Y is oxygen (O), sulphur (S), a radical N—$R^1$ or a radical P—$R^1$, where $R^1$ possesses the definitions identified below, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphinyl radical, optionally substituted in each case by one or more alkyl, halogen, alkoxy, aryl or heteroaryl radicals, $R^2$, $R^3$, $R^4$ and $R^5$ are identical or different and are hydrogen or organic or inorganic radicals, $R^6$ is H or an alkyl, alkenyl, alkynyl or aryl radical, and L is a ligand having the same definitions as stated for formula (A), (iv) a catalyst of the formula (VII)-(XVII), where Mes in each case stands for 2,4,6-trimethylphenyl,

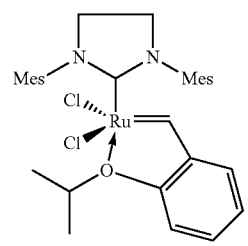

(VII)

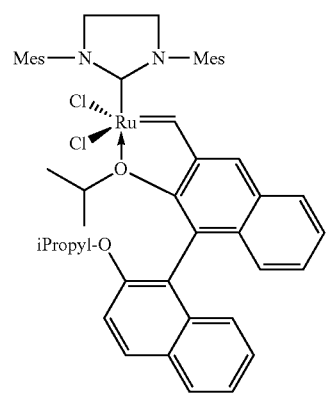

(VIII)

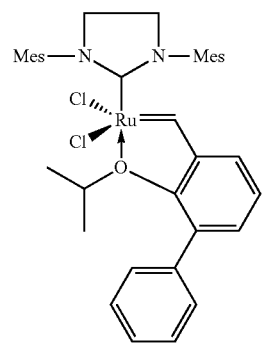

(IX)

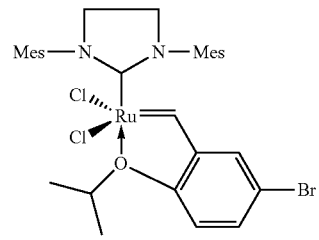

(X)

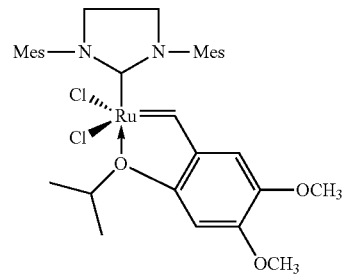

(XI)

-continued

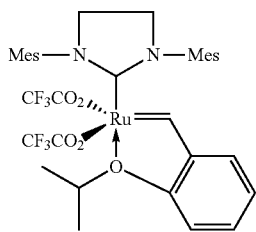

(XII)

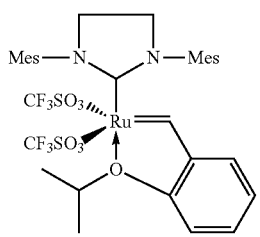

(XIII)

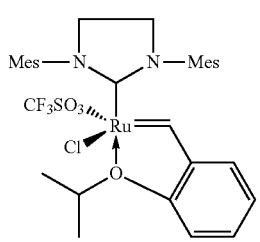

(XIV)

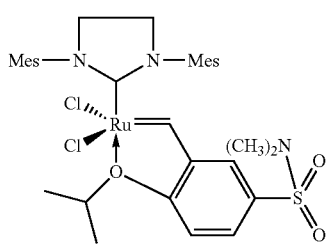

(XV)

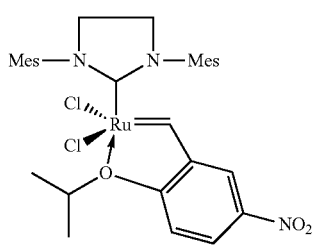

(XVI)

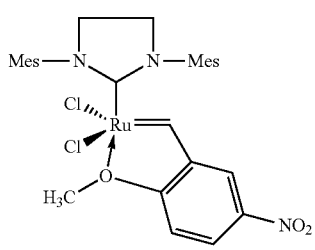

(XVII)

(v) catalysts of the general formula (G), (H) or (K),

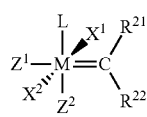 (G)

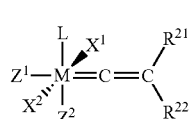 (H)

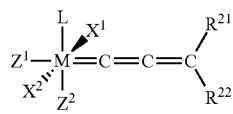 (K)

in which

M is osmium or ruthenium, $X^1$ and $X^2$ are identical or different and represent two ligands, L represents a ligand, $Z^1$ and $Z^2$ are identical or different and represent neutral electron donors, $R^{21}$ and $R^{22}$ independently of one another are hydrogen, alkyl, cycloalkyl, alkenyl, alkynyl, aryl, carboxylate, alkoxy, alkenyloxy, alkynyloxy, aryloxy, alkoxycarbonyl, alkylamine, alkylthio, alkylsulphonyl or alkylsulphinyl, optionally substituted by one or more radicals selected from alkyl, halogen, alkoxy, aryl or heteroaryl, and (vi) a catalyst of the following formula, where Mes in each case stands for 2,4,6-trimethylphenyl

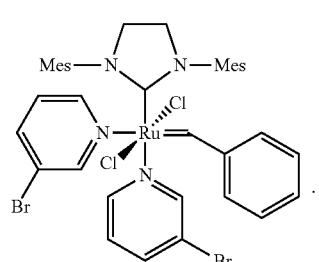

7. The process according to claim 5 or 6, wherein an amount of catalyst used, based on the partially hydrogenated nitrile rubber used, is 5 to 1000 ppm of noble metal.

8. The process according to claim 5 or 6, wherein a concentration of the partially hydrogenated nitrile rubber in the reaction mixture is 1% to 20% by weight.

9. The process according to claim 5 or 6, wherein the metathesis reaction is carried out at a temperature of 20° C. to 150° C.

10. A vulcanizable mixture comprising:
(i) at least one partially hydrogenated nitrile rubber having a degree of hydrogenation of 50% to 97%, and a ratio of solution viscosity (SV) to weight average of the molecular weight (Mw) of $4*10^{-3}$ to $30*10^{-3}$ Pa*s*mol/kg, and
(ii) at least one peroxidic crosslinking system.

11. The vulcanizable mixture according to claim 10, further comprising (iii) at least one filler and/or (v) one or more further, different additives.

12. A process for preparing the vulcanizable mixtures according to claim 10 or 11, the process comprising mixing the partially hydrogenated nitrile rubber (i) with at least one peroxidic crosslinking system (ii), optionally at least one filler (iii) and/or one or more further, different additives (iv).

13. A process for producing vulcanizates, the process comprising crosslinking the vulcanizable mixture according to claim 10 or 11 by temperature increase.

14. A vulcanizate obtained by the process according to claim 13.

15. The partially hydrogenated nitrile rubbers according to claim 1, wherein the degree of hydrogenation is 55% to 96%, and the ratio of solution viscosity (SV) to the weight average of the molecular weight (Mw) is $5*10^{-3}$ to $30*10^{-3}$ Pa*s*mol/kg.

16. The partially hydrogenated nitrile rubbers according to claim 1, wherein the degree of hydrogenation is 57.5% to 95.5%, and the ratio of solution viscosity (SV) to the weight average of the molecular weight (Mw) is $6*10^{-3}$ to $30*10^{-3}$ Pa*s*mol/kg.

17. The partially hydrogenated nitrile rubbers according to claim 1, comprising repeating units derived from at least one conjugated diene and at least one $\alpha,\beta$-unsaturated nitrile, wherein C=C double bonds of the copolymerized diene repeating units are 60% to 95% hydrogenated, and the ratio of solution viscosity (SV) to the weight average of the molecular weight (Mw) is $6.5*10^{-3}$ to $30*10^{-3}$ Pa*s*mol/kg.

18. The vulcanizable mixture according to claim 10, wherein the at least one partially hydrogenated nitrile rubber has a degree of hydrogenation of 60% to 95%, and a ratio of solution viscosity (SV) to weight average of the molecular weight (Mw) of $6.5*10^{-3}$ to $30*10^{-3}$ Pa*s*mol/kg.

* * * * *